(12) United States Patent
Chou et al.

(10) Patent No.: US 11,280,706 B2
(45) Date of Patent: Mar. 22, 2022

(54) DILUTION CALIBRATION

(71) Applicant: Essenlix Corporation, Monmouth Junction, NJ (US)

(72) Inventors: Stephen Y. Chou, Princeton, NJ (US); Wei Ding, East Windsor, NJ (US)

(73) Assignee: Essenlix Corporation, Monmouth Junction, NJ (US)

( * ) Notice: Subject to any disclaimer, the term of this patent is extended or adjusted under 35 U.S.C. 154(b) by 0 days.

(21) Appl. No.: 16/051,650

(22) Filed: Aug. 1, 2018

(65) Prior Publication Data

US 2020/0064236 A1 Feb. 27, 2020

Related U.S. Application Data

(60) Provisional application No. 62/539,663, filed on Aug. 1, 2017.

(51) Int. Cl.
| | |
|---|---|
| *B01L 9/00* | (2006.01) |
| *G01N 1/28* | (2006.01) |
| *G01N 35/00* | (2006.01) |
| *B01L 3/00* | (2006.01) |
| *G01N 15/00* | (2006.01) |

(52) U.S. Cl.
CPC .......... *G01N 1/2813* (2013.01); *B01L 3/5027* (2013.01); *B01L 9/56* (2019.08); *G01N 35/00029* (2013.01); *G01N 2001/282* (2013.01); *G01N 2015/008* (2013.01); *G01N 2035/00148* (2013.01)

(58) Field of Classification Search
CPC .. G01N 1/2813; G01N 2001/282; B01L 9/56; B01L 3/5027
See application file for complete search history.

(56) References Cited

U.S. PATENT DOCUMENTS

| | | |
|---|---|---|
| 3,368,872 A | 2/1968 | Natelson |
| 3,447,863 A | 6/1969 | Patterson |
| 3,895,661 A | 7/1975 | Praglin et al. |
| 3,925,166 A | 12/1975 | Blume |
| 3,992,158 A | 11/1976 | Przybylowicz et al. |
| 4,022,521 A | 5/1977 | Hall et al. |
| 4,066,412 A | 1/1978 | Johnson et al. |
| 4,088,448 A | 5/1978 | Lilja et al. |
| 4,171,866 A | 10/1979 | Tolles |
| 4,233,029 A | 11/1980 | Columbus |
| 4,255,384 A | 3/1981 | Kitajima et al. |
| 4,258,001 A | 3/1981 | Pierce et al. |
| 4,329,054 A | 5/1982 | Bachalo |
| 4,402,614 A | 9/1983 | Porath |

(Continued)

FOREIGN PATENT DOCUMENTS

| | | |
|---|---|---|
| AU | 198813789 A | 9/1988 |
| AU | 619459 B | 1/1992 |

(Continued)

OTHER PUBLICATIONS

Written Opinion for PCT/US2018/017713 established by ISA/KR, dated Jun. 20, 2018.

(Continued)

*Primary Examiner* — Jamel E Williams

(57) ABSTRACT

The present disclosure provides devices, systems, and methods, for performing biological and chemical assays.

37 Claims, 6 Drawing Sheets

(56) References Cited

U.S. PATENT DOCUMENTS

| | | |
|---|---|---|
| 4,427,294 A | 1/1984 | Nardo |
| 4,430,436 A | 2/1984 | Koyama et al. |
| 4,596,695 A | 6/1986 | Cottingham |
| 4,745,075 A | 5/1988 | Hadfield et al. |
| 4,806,311 A | 2/1989 | Greenquist |
| 4,883,642 A | 11/1989 | Bisconte |
| 4,906,439 A | 3/1990 | Grenner |
| 4,911,782 A | 3/1990 | Brown |
| 4,950,455 A | 8/1990 | Smith |
| 5,002,736 A | 3/1991 | Babbitt et al. |
| 5,039,487 A | 8/1991 | Smith |
| 5,096,836 A | 3/1992 | Macho et al. |
| 5,122,284 A | 6/1992 | Braynin et al. |
| 5,132,097 A | 7/1992 | Van Deusen et al. |
| 5,169,601 A | 12/1992 | Ohta et al. |
| 5,188,968 A | 2/1993 | Kano et al. |
| 5,223,219 A | 6/1993 | Subramanian et al. |
| 5,281,540 A | 1/1994 | Merkh et al. |
| 5,306,467 A | 4/1994 | Douglas-Hamilton et al. |
| 5,321,975 A | 6/1994 | Wardlaw |
| 5,362,648 A | 11/1994 | Koreyasu et al. |
| 5,413,732 A | 5/1995 | Buhl et al. |
| 5,427,959 A | 6/1995 | Nishimura et al. |
| 5,431,880 A | 7/1995 | Kramer |
| 5,591,403 A | 1/1997 | Gavin et al. |
| 5,623,415 A | 4/1997 | O'Bryan et al. |
| 5,753,456 A | 5/1998 | Naqui et al. |
| 5,768,407 A | 6/1998 | Shen et al. |
| 5,858,648 A | 1/1999 | Steel et al. |
| 5,879,628 A | 3/1999 | Ridgeway et al. |
| 5,888,834 A | 3/1999 | Ishikawa et al. |
| 5,939,326 A | 8/1999 | Chupp et al. |
| 5,948,686 A | 9/1999 | Wardlaw |
| 6,004,821 A | 12/1999 | Levine et al. |
| 6,016,367 A | 1/2000 | Benedetti et al. |
| 6,017,767 A | 1/2000 | Chandler |
| 6,022,734 A | 2/2000 | Wardlaw |
| 6,106,778 A | 8/2000 | Oku et al. |
| 6,180,314 B1 | 1/2001 | Berndt |
| 6,235,536 B1 | 5/2001 | Wardlaw |
| 6,350,613 B1 | 2/2002 | Wardlaw et al. |
| 6,358,475 B1 | 3/2002 | Berndt |
| 6,429,027 B1 | 8/2002 | Chee et al. |
| 6,503,760 B2 | 1/2003 | Malmqvist et al. |
| 6,551,554 B1 | 4/2003 | Vermeiden et al. |
| 6,623,701 B1 | 9/2003 | Eichele et al. |
| 6,632,652 B1 | 10/2003 | Austin et al. |
| 6,714,287 B2 | 3/2004 | Berndt |
| 6,723,290 B1 | 4/2004 | Wardlaw |
| 6,844,201 B2 | 1/2005 | Malmqvist et al. |
| 6,866,823 B2 | 3/2005 | Wardlaw |
| 6,869,570 B2 | 3/2005 | Wardlaw |
| 6,893,850 B2 | 5/2005 | Ostuni et al. |
| 6,921,514 B1 | 7/2005 | Vetter et al. |
| 6,929,953 B1 | 8/2005 | Wardlaw |
| 6,939,032 B2 | 9/2005 | Cosby et al. |
| 7,101,341 B2 | 9/2006 | Tsukashima et al. |
| 7,179,423 B2 | 2/2007 | Bohm et al. |
| 7,282,367 B2 | 10/2007 | Kawamura |
| 7,393,658 B2 | 7/2008 | Carbonell et al. |
| 7,410,617 B2 | 8/2008 | Sakamoto |
| 7,410,807 B2 | 8/2008 | D'Aurora |
| 7,468,160 B2 | 12/2008 | Thompson et al. |
| 7,510,841 B2 | 3/2009 | Stuelpnagel et al. |
| 7,510,848 B2 | 3/2009 | Hammond et al. |
| 7,547,424 B2 | 6/2009 | Haab et al. |
| 7,731,901 B2 | 6/2010 | Wardlaw |
| 7,738,094 B2 | 6/2010 | Goldberg |
| 7,850,916 B2 | 12/2010 | Wardlaw |
| 7,862,773 B2 | 1/2011 | Ibrahim |
| 7,863,411 B2 | 1/2011 | Hammond et al. |
| 7,897,376 B2 | 3/2011 | Porter et al. |
| 7,901,897 B2 | 3/2011 | Stuelpnagel et al. |
| 7,903,241 B2 | 3/2011 | Wardlaw et al. |
| 7,929,121 B2 | 4/2011 | Wardlaw et al. |
| 7,929,122 B2 | 4/2011 | Wardlaw et al. |
| 7,943,093 B2 | 5/2011 | Adrien et al. |
| 7,951,599 B2 | 5/2011 | Levine et al. |
| 7,995,194 B2 | 8/2011 | Wardlaw et al. |
| 8,045,165 B2 | 10/2011 | Wardlaw et al. |
| 8,058,073 B2 | 11/2011 | Chiapperi et al. |
| 8,077,296 B2 | 12/2011 | Wardlaw et al. |
| 8,081,303 B2 | 12/2011 | Levine et al. |
| 8,133,738 B2 | 3/2012 | Levine et al. |
| 8,158,434 B2 | 4/2012 | Wardlaw |
| 8,221,985 B2 | 7/2012 | Wardlaw et al. |
| 8,241,572 B2 | 8/2012 | Wardlaw |
| 8,269,954 B2 | 9/2012 | Levine et al. |
| 8,284,384 B2 | 10/2012 | Levine et al. |
| 8,287,820 B2 | 10/2012 | Williams et al. |
| 8,310,658 B2 | 11/2012 | Wardlaw et al. |
| 8,310,659 B2 | 11/2012 | Wardlaw et al. |
| 8,319,954 B2 | 11/2012 | Wardlaw et al. |
| 8,326,008 B2 | 12/2012 | Lalpuria et al. |
| 8,338,579 B2 | 12/2012 | Adams et al. |
| 8,361,799 B2 | 1/2013 | Levine et al. |
| 8,367,012 B2 | 2/2013 | Wardlaw |
| 8,462,332 B2 | 6/2013 | Pugia et al. |
| 8,467,063 B2 | 6/2013 | Wardlaw et al. |
| 8,472,693 B2 | 6/2013 | Davis et al. |
| 8,481,282 B2 | 7/2013 | Levine et al. |
| 8,502,963 B2 | 8/2013 | Levine et al. |
| 8,513,032 B2 | 8/2013 | Jablonski et al. |
| 8,569,076 B2 | 10/2013 | Wardlaw et al. |
| 8,594,768 B2 | 11/2013 | Phillips et al. |
| 8,604,161 B2 | 12/2013 | Hammond et al. |
| 8,628,952 B2 | 1/2014 | Stuelpnagel et al. |
| 8,633,013 B2 | 1/2014 | Kaiser et al. |
| 8,638,427 B2 | 1/2014 | Wardlaw et al. |
| 8,717,673 B2 | 5/2014 | Selvin et al. |
| 8,741,630 B2 | 6/2014 | Dickinson et al. |
| 8,750,966 B2 | 6/2014 | Phillips et al. |
| 8,778,687 B2 | 7/2014 | Levine et al. |
| 8,781,203 B2 | 7/2014 | Davis et al. |
| 8,796,186 B2 | 8/2014 | Shirazi |
| 8,797,527 B2 | 8/2014 | Hukari et al. |
| 8,835,186 B2 | 9/2014 | Jablonski et al. |
| 8,837,803 B2 | 9/2014 | Wang et al. |
| 8,842,264 B2 | 9/2014 | Wardlaw et al. |
| 8,885,154 B2 | 11/2014 | Wardlaw et al. |
| 8,906,700 B2 | 12/2014 | Lim et al. |
| 8,911,815 B2 | 12/2014 | Kram et al. |
| 8,974,732 B2 | 3/2015 | Lalpuria et al. |
| 8,994,930 B2 | 3/2015 | Levine et al. |
| 9,023,641 B2 | 5/2015 | Rodriguez et al. |
| 9,044,268 B2 | 6/2015 | Phillips et al. |
| 9,046,473 B2 | 6/2015 | Levine et al. |
| 9,084,995 B2 | 7/2015 | Wardlaw |
| 9,086,408 B2 | 7/2015 | Egan et al. |
| 9,097,640 B2 | 8/2015 | Goldberg et al. |
| 9,199,233 B2 | 12/2015 | Wardlaw |
| 9,274,094 B2 | 3/2016 | Wardlaw et al. |
| 9,291,617 B2 | 3/2016 | Levine et al. |
| 9,322,835 B2 | 4/2016 | Wardlaw |
| 9,347,962 B2 | 5/2016 | Salsman |
| 9,354,159 B2 | 5/2016 | Vaartstra |
| 9,395,365 B2 | 7/2016 | Levine et al. |
| 9,469,871 B2 | 10/2016 | Bearinger et al. |
| 9,523,670 B2 | 12/2016 | Mueller et al. |
| 9,696,252 B2 | 7/2017 | Wardlaw |
| 10,138,517 B2 * | 11/2018 | Mehta ............... C12Q 1/6869 |
| 2001/0031500 A1 | 10/2001 | Kawamura |
| 2001/0055882 A1 | 12/2001 | Ostuni |
| 2002/0028158 A1 | 3/2002 | Wardlaw |
| 2002/0126271 A1 | 9/2002 | Berndt |
| 2003/0068614 A1 | 4/2003 | Cima et al. |
| 2003/0107946 A1 | 6/2003 | Cosby et al. |
| 2003/0109059 A1 | 6/2003 | Adrien et al. |
| 2003/0138971 A1 | 7/2003 | D'Aurora |
| 2004/0131345 A1 | 7/2004 | Kylberg et al. |
| 2004/0156755 A1 | 8/2004 | Levine |
| 2004/0185482 A1 | 9/2004 | Stuelpnagel et al. |
| 2004/0214310 A1 | 10/2004 | Parker et al. |
| 2004/0229280 A1 | 11/2004 | Hammond et al. |

(56) References Cited

U.S. PATENT DOCUMENTS

| | | |
|---|---|---|
| 2004/0259162 A1 | 12/2004 | Kappel et al. |
| 2005/0026161 A1 | 2/2005 | Jablonski et al. |
| 2005/0032138 A1 | 2/2005 | Lathrop et al. |
| 2005/0106074 A1 | 5/2005 | Sakamoto |
| 2005/0158880 A1 | 7/2005 | Ostuni et al. |
| 2005/0221377 A1 | 10/2005 | Ibrahrim |
| 2005/0254995 A1 | 11/2005 | Sostek et al. |
| 2006/0015157 A1 | 1/2006 | Leong |
| 2006/0051253 A1 | 3/2006 | Gausepohl |
| 2006/0062440 A1 | 3/2006 | Hollars et al. |
| 2006/0062695 A1 | 3/2006 | Haab et al. |
| 2006/0078892 A1 | 4/2006 | Hammond et al. |
| 2006/0090658 A1 | 5/2006 | Phillips |
| 2006/0160134 A1 | 7/2006 | Melker et al. |
| 2007/0087442 A1 | 4/2007 | Wardlaw |
| 2007/0243117 A1 | 10/2007 | Wardlaw |
| 2008/0028962 A1 | 2/2008 | Phillips |
| 2008/0064093 A1 | 3/2008 | Porter et al. |
| 2008/0131883 A1 | 6/2008 | Adams et al. |
| 2008/0187466 A1 | 8/2008 | Wardlaw |
| 2008/0214947 A1 | 9/2008 | Hunt et al. |
| 2008/0268474 A1 | 10/2008 | Hammond et al. |
| 2008/0274564 A1 | 11/2008 | D'Aurora |
| 2008/0286152 A1 | 11/2008 | Schmidt et al. |
| 2009/0011451 A1 | 1/2009 | Rodriguez et al. |
| 2009/0155123 A1 | 6/2009 | Williams et al. |
| 2009/0176201 A1 | 7/2009 | Jablonski et al. |
| 2009/0191641 A1 | 7/2009 | Chiapperi et al. |
| 2009/0211344 A1 | 8/2009 | Wang |
| 2009/0227472 A1 | 9/2009 | Stuelpnagel, Jr. et al. |
| 2009/0233329 A1 | 9/2009 | Rodriguez et al. |
| 2009/0237665 A1 | 9/2009 | Wardlaw et al. |
| 2009/0238437 A1 | 9/2009 | Levine et al. |
| 2009/0238438 A1 | 9/2009 | Wardlaw et al. |
| 2009/0238439 A1 | 9/2009 | Wardlaw et al. |
| 2009/0239257 A1 | 9/2009 | Levine et al. |
| 2009/0246781 A1 | 10/2009 | Klem et al. |
| 2009/0251683 A1 | 10/2009 | Wardlaw et al. |
| 2009/0252399 A1 | 10/2009 | Wardlaw et al. |
| 2009/0253218 A1 | 10/2009 | Wardlaw et al. |
| 2009/0257632 A1 | 10/2009 | Lalpuria et al. |
| 2009/0258371 A1 | 10/2009 | Wardlaw et al. |
| 2009/0298716 A1 | 12/2009 | Stuelpnagel, Jr. et al. |
| 2010/0081583 A1 | 4/2010 | Shirazi |
| 2010/0085067 A1 | 4/2010 | Gabriel et al. |
| 2010/0151593 A1 | 6/2010 | D'Aurora |
| 2010/0216248 A1 | 8/2010 | Wardlaw |
| 2010/0255509 A1 | 10/2010 | Levine et al. |
| 2010/0255605 A1 | 10/2010 | Wardlaw |
| 2010/0272345 A1 | 10/2010 | Wardlaw |
| 2010/0273244 A1 | 10/2010 | Wardlaw |
| 2010/0291562 A1 | 11/2010 | Adler |
| 2011/0009297 A1 | 1/2011 | Jones et al. |
| 2011/0059481 A1 | 3/2011 | Wardlaw et al. |
| 2011/0092389 A1 | 4/2011 | Dickinson et al. |
| 2011/0093249 A1* | 4/2011 | Holmes ............... G16H 50/80 703/6 |
| 2011/0149061 A1 | 6/2011 | Wardlaw et al. |
| 2011/0149277 A1 | 6/2011 | Pugia et al. |
| 2011/0164803 A1 | 7/2011 | Wang et al. |
| 2011/0193957 A1 | 8/2011 | Wardlaw et al. |
| 2011/0206557 A1 | 8/2011 | Phan et al. |
| 2011/0230644 A1 | 9/2011 | Jablonski et al. |
| 2011/0230740 A1 | 9/2011 | Levine et al. |
| 2011/0244593 A1 | 10/2011 | Wardlaw |
| 2011/0256573 A1 | 10/2011 | Davis et al. |
| 2011/0294198 A1 | 12/2011 | Wardlaw |
| 2011/0294200 A1 | 12/2011 | Wardlaw et al. |
| 2012/0021456 A1 | 1/2012 | Levine et al. |
| 2012/0034647 A1 | 2/2012 | Herzog et al. |
| 2012/0099108 A1 | 4/2012 | Wardlaw et al. |
| 2012/0107799 A1 | 5/2012 | Daum |
| 2012/0108787 A1 | 5/2012 | Lue |
| 2012/0147357 A1 | 6/2012 | Wardlaw et al. |
| 2012/0157332 A1 | 6/2012 | Kumar et al. |
| 2012/0164682 A1 | 6/2012 | Levine et al. |
| 2012/0164719 A1 | 6/2012 | Levine et al. |
| 2012/0195489 A1 | 8/2012 | Levine et al. |
| 2012/0300293 A1 | 11/2012 | Selvin et al. |
| 2013/0029373 A1 | 1/2013 | Levine et al. |
| 2013/0040842 A1 | 2/2013 | Ambergen |
| 2013/0052331 A1 | 2/2013 | Kram et al. |
| 2013/0065788 A1 | 3/2013 | Glezer et al. |
| 2013/0078668 A1 | 3/2013 | Levine et al. |
| 2013/0102018 A1 | 4/2013 | Schentag et al. |
| 2013/0157288 A1 | 6/2013 | Kilfeather et al. |
| 2013/0170729 A1 | 7/2013 | Wardlaw et al. |
| 2013/0176551 A1 | 7/2013 | Wardlaw et al. |
| 2013/0203107 A1 | 8/2013 | Lalpuria et al. |
| 2013/0208972 A1 | 8/2013 | Levine et al. |
| 2013/0209332 A1 | 8/2013 | Wardlaw |
| 2013/0217146 A1 | 8/2013 | Wardlaw et al. |
| 2013/0265054 A1 | 10/2013 | Lowery, Jr. et al. |
| 2013/0309679 A1 | 11/2013 | Ismagilov et al. |
| 2014/0004554 A1 | 1/2014 | Davis et al. |
| 2014/0248647 A1 | 9/2014 | Levine et al. |
| 2014/0315242 A1 | 10/2014 | Rodriguez et al. |
| 2014/0368631 A1 | 12/2014 | Wardlaw et al. |
| 2015/0036131 A1 | 2/2015 | Salsman |
| 2015/0097939 A9 | 4/2015 | Wardlaw et al. |
| 2015/0253321 A1 | 9/2015 | Chou et al. |
| 2015/0317506 A1 | 11/2015 | Xie et al. |
| 2015/0323519 A1 | 11/2015 | Wardlaw |
| 2016/0025637 A1 | 1/2016 | Halverson et al. |
| 2016/0033496 A1 | 2/2016 | Chou et al. |
| 2016/0047797 A1 | 2/2016 | Levine et al. |
| 2016/0245797 A1 | 8/2016 | Ahmad et al. |
| 2016/0266091 A1 | 9/2016 | Levine et al. |
| 2017/0021356 A1 | 1/2017 | Dority et al. |
| 2017/0038401 A1 | 2/2017 | Holmes et al. |
| 2017/0045504 A1 | 2/2017 | Bloom |

FOREIGN PATENT DOCUMENTS

| | | |
|---|---|---|
| CN | 1299466 | 6/2001 |
| CN | 1302229 | 7/2001 |
| CN | 1166950 | 9/2004 |
| CN | 1188217 | 2/2005 |
| CN | 102027369 | 4/2011 |
| EP | 261667 A2 | 3/1988 |
| EP | 291153 A1 | 11/1988 |
| EP | 261667 A3 | 5/1989 |
| EP | 291153 B1 | 6/1992 |
| EP | 261667 B1 | 2/1993 |
| EP | 0961110 | 12/1999 |
| EP | 1949310 A2 | 7/2008 |
| EP | 2290100 | 3/2011 |
| EP | 1949310 A4 | 11/2011 |
| EP | 2439515 | 4/2012 |
| EP | 2554987 | 2/2013 |
| EP | 3026433 | 6/2016 |
| EP | 1949310 B1 | 2/2019 |
| WO | 1991020009 | 12/1991 |
| WO | 1999044743 | 9/1999 |
| WO | 1999045385 | 9/1999 |
| WO | 2003062920 | 7/2003 |
| WO | 2005114145 | 12/2005 |
| WO | 2005100539 | 1/2006 |
| WO | 2007112332 | 10/2007 |
| WO | 2009117652 | 9/2009 |
| WO | 2009117664 | 9/2009 |
| WO | 2009117678 | 9/2009 |
| WO | 2009117682 | 9/2009 |
| WO | 2009124186 | 10/2009 |
| WO | 2009124190 | 10/2009 |
| WO | 2009126800 | 10/2009 |
| WO | 2010115026 | 10/2010 |
| WO | 2014055559 | 4/2014 |
| WO | 2014089468 | 6/2014 |
| WO | 2014183049 | 11/2014 |
| WO | 2014205576 | 12/2014 |
| WO | 2017048871 | 3/2017 |

(56) References Cited

FOREIGN PATENT DOCUMENTS

OTHER PUBLICATIONS

Van Vliet, Dillys et al., Prediction of asthma exacerbations in children by innovative exhaled inflammatory markers: Results of a longitudinal study, PLOS ONE, Mar. 23, 2015, vol. 10. No. 3, e0119434.

* cited by examiner

DILUTION CALIBRATION

CROSS-REFERENCE

This application claims the benefit of U.S. Provisional Patent Application 62/539,663, filed Aug. 1, 2017, which is entirely incorporated herein by reference for all purposes.

FIELD

The present invention is related to the field of bio/chemical sampling, sensing, assays and other applications. Particularly, the present invention is related to how to determine the dilution factor for a sample.

BACKGROUND

In many bio/chemical sensing and testing processes (e.g., immunoassay, nucleotide assay, etc.), chemical reactions, and other processes, samples are often diluted with a foreign matter(s) (i.e. diluent) when subject to the analysis. In these cases, it is usually necessary to determine the dilution factor and calibrate the sample analysis with the dilution factor. However, the fact that sometimes the volume of the diluent is unknown or hard to be quantified accurately makes it challenging to determine the dilution factor, yet it is often a very critical step for the following bio/chemical sensing/testing, reactions and/or other processes involving the diluted sample. Among others, the present invention provides methods and devices to tackle this challenge.

BRIEF DESCRIPTION OF THE DRAWINGS

The skilled artisan will understand that the drawings, described below, are for illustration purposes only. The drawings are not intended to limit the scope of the present teachings in any way. The drawings may not be in scale. In the figures that present experimental data points, the lines that connect the data points are for guiding a viewing of the data only and have no other meaning.

DETAILED DESCRIPTION OF EXEMPLARY EMBODIMENTS

Figure 1:
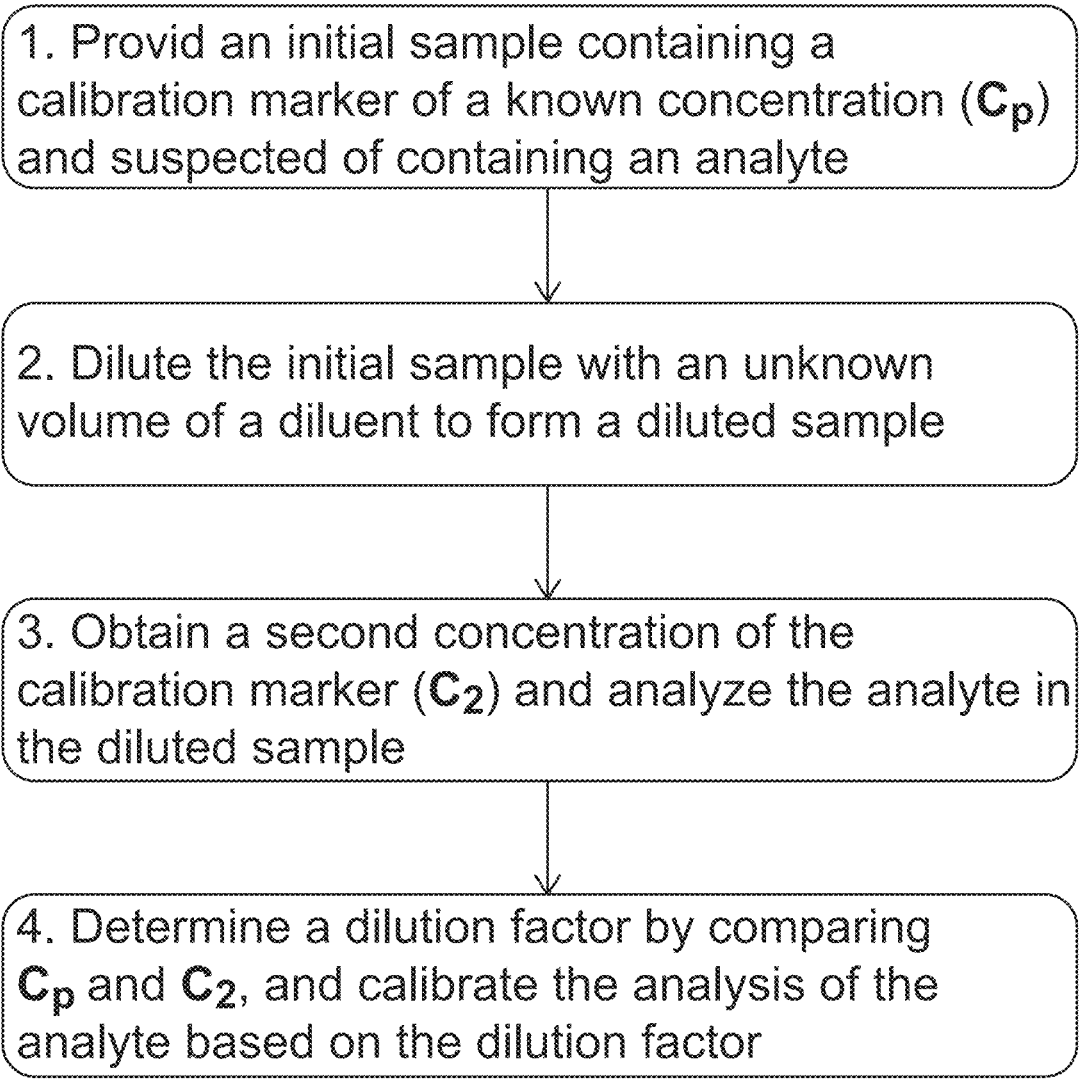
FIG. 1 is a flow diagram of the method of dilution calibration and sample analysis for a sample according to some embodiments of the present invention.

The following detailed description illustrates some embodiments of the invention by way of example and not by way of limitation. The section headings and any subtitles used herein are for organizational purposes only and are not to be construed as limiting the subject matter described in any way. The contents under a section heading and/or subtitle of are not limited to the section heading and/or subtitle, but apply to the entire description of the present invention.

The citation of any publication is for its disclosure prior to the filing date and should not be construed as an admission that the present claims are not entitled to antedate such publication by virtue of prior invention. Further, the dates of publication provided can be different from the actual publication dates which can need to be independently confirmed.

The present invention relates to methods and devices for dilution calibration and sample analysis for a sample. One aspect of the present invention provides a method, wherein the concentration of a calibration marker, which is a component of the sample with a known concentration before the dilution, is measured after the dilution to determine the dilution factor, by comparing the concentration of the calibration marker in the sample before and after the dilution. In other aspect, the present invention provides a method, wherein the concentration of the calibration marker is unknown before the dilution and the dilution factor is determined by comparing the measured concentration of the calibration marker in the sample before and after the dilution. In some preferred embodiments of the present invention, a method of dilution calibration and sample analysis for a blood sample is presented, wherein the dilution factor is determined by comparing the measured concentration of a calibration marker in the sample before and after the dilution.

Exemplary methods and device, according to some embodiments of the present invention, for dilution calibration and sample analysis for a human blood sample using red blood cells and white blood cells have been achieved experimentally and are provided here. Exemplary calibration markers that may be used for determining dilution factors in various bodily fluid samples are also provided according to some embodiments of the present invention.

Definitions

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present teachings, some exemplary methods and materials are now described.

The term "dilution" as used herein refers to the act or procedure of reducing the concentration of a matter of interest in a first solution by mixing the first solution with a liquid that does not contain the matter of interest, the liquid used to dilute the first solution is termed as "diluent".

The term "dilution factor" as used herein refers to a numerical parameter that reflects, by itself or by its derivatives, the relative ratio between an initial sample and a diluent that is added to the initial sample, whereby resulting in a diluted sample. The terms "dilution factor" and "dilution ratio" are interchangeable. Very often, the dilution factor is a direct readout of the relationship between the initial and the diluent. In some cases, the dilution factor is written in the format like 1:10 or 1/10, wherein 1 stands for the relative volume or weight or other measurement of the initial sample, and 10 stands for the corresponding measurement of the diluent, or wherein 1 stands for the diluent, and 10 stands for the initial sample. In other cases, the dilution factor is written in the format like 0.1, which is the ratio of the volume or weight or other measurement of initial sample vs. diluent, or the other way around. Yet in some other cases, the dilution factor can also be a direct readout of the relationship between the initial sample and the diluted sample, or between the diluent and the diluted sample.

The term "sample" as used herein generally refers to a material or mixture of materials containing one or more analytes of interest. The term "sample" may refer to the "initial sample" or the "diluted sample" depending on the specific context therewith. If not specified, the term "sample" when used alone refers to either "initial sample" or "diluted sample". The term "initial sample" as used herein particularly refers to the sample that is to be diluted, the dilution product of which is the subject that the present method of determining a dilution factor is applied on. The term "diluted sample" as used herein particularly refers to the dilution product that is obtained by diluting the initial sample with the diluent.

The term "calibration marker" as used herein refers to any analyte contained in the sample, the detectable amount of which is not affected by the addition of the diluent. Here, the term "detectable amount" refers to the amount of the analyte that is detected by the calibration-measuring device and method provided herein.

The terms "dilution calibration" and "calibrate" as used herein refers to the act of determining a parameter of a sample before the sample being diluted by taking consideration of the parameter value after the sample dilution and the dilution factor. The parameter to be calibrated is typically the concentration of an analyte in the sample, such as, but not limited to, proteins, peptides, DNAs, RNAs, nucleic acids, inorganic molecules and ions, organic small molecules, cells, tissues, viruses, nanoparticles with different shapes, and any combination thereof.

The term "analyte," as used herein refers to any substance that is suitable for testing in the present method.

The terms "assaying" and "analyzing" as used herein are interchangeable, and refer to testing a sample to detect the presence and/or abundance of an analyte.

As used herein, the terms "determining," "measuring," "assessing," "analysis", "analyzing", "testing" and "assaying" are used interchangeably and include both quantitative and qualitative determinations.

A "biomarker," as used herein, is any molecule or compound that is found in a sample of interest and that is known to be diagnostic of or associated with the presence of or a predisposition to a disease or condition of interest in the subject from which the sample is derived. Biomarkers include, but are not limited to, polypeptides or a complex thereof (e.g., antigen, antibody), nucleic acids (e.g., DNA, miRNA, mRNA), drug metabolites, lipids, carbohydrates, hormones, vitamins, etc., that are known to be associated with a disease or condition of interest.

The term "smart phone" or "mobile phone", which are used interchangeably, refers to the type of phones that has a camera and communication hardware and software that can take an image using the camera, manipulate the image taken by the camera, and communicate data to a remote place. In some embodiments, the Smart Phone has a flash light.

1. Method of Dilution Calibration and Sample Analysis

FIG. 1 is a flow diagram of an exemplary embodiment of a method of dilution calibration and sample analysis for a diluted sample provided by the present invention. The method comprises:

(i) providing an initial sample containing a calibration marker and suspected of containing an analyte, the calibration marker having a concentration with a known preset concentration $C_p$;
(ii) diluting the initial sample with an unknown volume of a diluent to form a diluted sample;
(iii) obtaining a second concentration of the calibration marker ($C_2$) and analyzing the analyte in the diluted sample; and
(iv) determining a dilution factor for the diluted sample by comparing the preset concentration $C_p$ and the second concentration $C_2$, and calibrating the analysis of the analyte based on the dilution factor.

In some embodiments, the preset concentration $C_p$ may be a predetermined concentration that is the real concentration of the calibration marker in the sample. In other embodiments, the preset concentration $C_p$ may be an estimated normal value, which is estimated based on past experiences, standards in the art, or other references. For instance, a normal range red blood cell count in healthy adult men is in 4.7 to 6.1 million cells/µl, therefore, when a blood sample from a healthy adult male subject is being diluted and analyzed and if red blood cells are taken as the calibration marker, any number in the range of $4.7 \times 10^6$-$6.1 \times 10^6$ cells/µl may be taken as the estimated preset value for the first concentration of red blood cells in the initial undiluted blood sample.

In some embodiments, the estimated normal value for the preset concentration may differ from a true value of the concentration of the calibration marker in the initial sample by only a small percentage close to zero. The term "a true value" as used herein refers to a value that accurately describes or indicates the physical existence of a subject matter in the aspect(s) of the subject matter that the value is supposed to describe or indicate. The difference between the preset value and the true value of the first concentration is 50% or less, 30% or less, 20% or less, 15% or less, 10% or less, 5% or less, 2.5% or less. In other embodiments, it should be noted, however, when the dilution factor is larger than 10, meaning that the initial sample is diluted by a diluent that has a volume larger than 10 times of the initial sample to form the diluted sample, the preset value may differ from the true value by a large percentage, (e.g., 50% or more, 100% or more, or 200% or more), but at the same order of magnitude as the true value. In yet other embodiments, the preset value may also be at a different order of magnitude than the true value.

Figure 2:
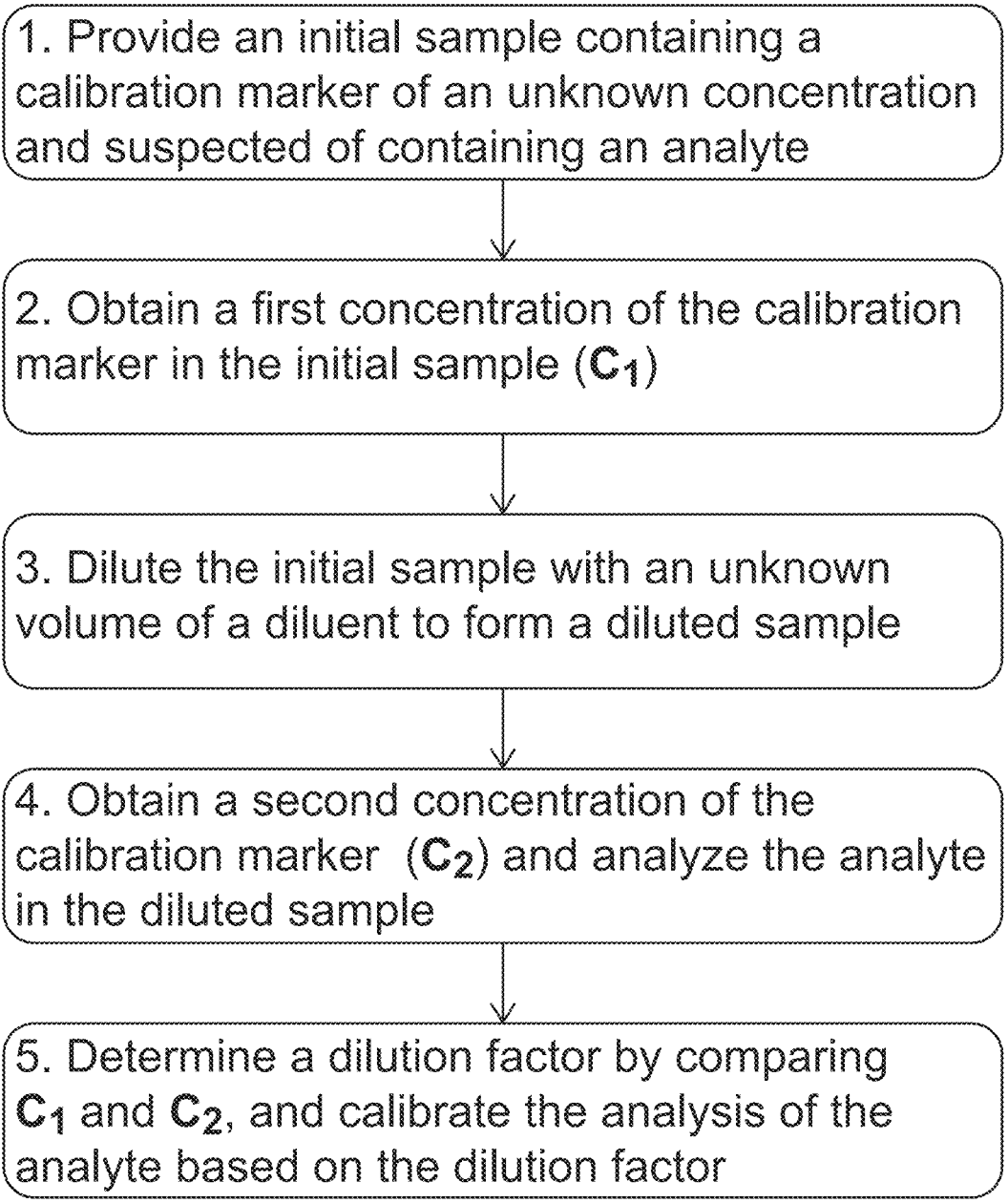
FIG. 2 is a flow diagram of the method of dilution calibration and sample analysis for a sample according to some other embodiments of the present invention.

FIG. 2 is a flow diagram of another exemplary embodiment of a method of dilution calibration and sample analysis for a diluted sample provided by the present invention. The method comprises:

(i) providing an initial sample containing a calibration marker and suspected of containing an analyte, the calibration marker having an unknown concentration;
(ii) obtaining a first concentration of the calibration marker ($C_1$) in the initial sample;
(iii) diluting the initial sample with an unknown volume of a diluent to form a diluted sample;
(iv) obtaining a second concentration of the calibration marker ($C_2$) and analyzing the analyte in the diluted sample; and
(v) determining a dilution factor for the diluted sample by comparing the first concentration $C_1$ and the second concentration $C_2$, and calibrating the analysis of the analyte based on the dilution factor.

As the order illustrated in FIG. 2, in some embodiments, the method may comprise: first obtaining the first concentration $C_1$ and then diluting the sample with the diluent to form the diluted sample. It is to be noted, however, in other embodiments, the method may comprise a step before the steps of obtaining the first concentration $C_1$ and diluting the sample: dividing the sample into at least two portions: a first portion and a second portion, the first portion to be used for the step of obtaining the first concentration $C_1$ and the second portion to be diluted with the diluent to form the diluted sample.

In some embodiments, the step of diluting the sample may be a single step of mixing the sample with the diluent, which may be a single foreign matter or a mixture of a plurality of foreign matters. In other embodiments, the diluting step may be a series of dilution steps, in which the sample is sequentially mixed with a plurality of foreign matters.

In some preferred embodiments, the step of obtaining the second concentration of the calibration marker and analyzing the analyte in the diluted sample is performed using one single assay device. In other words, in some embodiment, an assay device capable of both measuring the concentration of the calibration marker and analyzing the analyte in the sample is used for the step as mentioned above.

In some embodiments, the step (ii) of obtaining is performed using a first set of the assay device, and the step (iv) of obtaining and analyzing is performed using a second set of the assay device, and the two sets are of the same type.

In some embodiments, the step of analyzing the analyte in the diluted sample is to detect the presence and/or abundance of the analyte. In some embodiments, the analyzing step comprises performing a bio/chemical assay of the analyte, including, but not limited to, protein assay, nucleic acid assay, cell or tissue staining, biochemical reaction, electrochemical detection, electrical detection, and any combination thereof.

The step of calibrating the analysis of the analyte comprises the calibration of the readout of the analyte analysis by the dilution factor. For instance, in some embodiments, the analyte analysis to detect the concentration of a protein (e.g. Protein A) in the sample. The readout of Protein A in the diluted sample is y, while the dilution factor as determined by the present method is 1:10 (volume ratio, initial sample vs. diluent). Then the calibrated concentration of Protein A in the initial sample can be determined as 10y, by dividing y, the determined concentration in the diluted sample, by 1:10, the determined dilution factor for the diluted sample. In some other embodiments, the specific calibration steps may vary depending on the written format, unit, and/or other factors of the determined dilution factor and the readout of the analyte analysis.

Although the present invention may be particularly useful when the volume of the diluent is unknown to the user of the method, in some embodiments, it is also applicable for situations where the volume of the diluent is known to the user of the method.

2. Method of Using QMAX Device for Dilution Calibration and Sample Analysis

The assay device in the method of the present invention may be any type of device or apparatus that determines the concentration of the calibration marker in the sample or diluted sample accordingly. In some embodiments, it may comprise a first part that determines the volume (V) of a part or entirety of the sample to be analyzed, a second part that determines the amount of the calibration marker (CM) contained with the part or entirety of the sample, and a third part configured to calculate the concentration of the calibration marker ([CM]) based on the determined value of V and CM, [CM]=CM/V.

In some embodiments of the present invention, the assay device may be a CROF (compressed regulated open flow) device, or otherwise named QMAX (Q: quantitative, M: multiplexing, A: adding reagents, and X: acceleration) device, such as, but not limited to, the CROF device and QMAX device disclosed in U.S. Provisional Patent Application No. 62/202,989, which was filed on Aug. 10, 2015, U.S. Provisional Patent Application No. 62/218,455, which was filed on Sep. 14, 2015, U.S. Provisional Patent Application No. 62/293,188, which was filed on Feb. 9, 2016, U.S. Provisional Patent Application No. 62/305,123, which was filed on Mar. 8, 2016, U.S. Provisional Patent Application No. 62/369,181, which was filed on Jul. 31, 2016, U.S. Provisional Patent Application No. 62/394,753, which was filed on Sep. 15, 2016, PCT Application (designating U.S.) No. PCT/US2016/045437, which was filed on Aug. 10, 2016, PCT Application (designating U.S.) No. PCT/US2016/051775, which was filed on Sep. 14, 2016, PCT Application (designating U.S.) No. PCT/US2016/051794, which was filed on Sep. 15, 2016, and PCT Application (designating U.S.) No. PCT/US2016/054025, which was filed on Sep. 27, 2016, the complete disclosures of which are hereby incorporated by reference for all purposes.

In some embodiments, a QMAX device comprises:
a first plate, a second plate, and spacers, wherein:
  i. the plates are movable relative to each other into different configurations;
  ii. each of the plates has, on its respective surface, a sample contact area for contacting a sample with an analyte; and
  iii. one or both of the plates comprise spacers that are fixed with a respective plate, wherein the spacers have a predetermined substantially uniform height and a predetermined constant inter-spacer distance and wherein at least one of the spacers is inside the sample contact area;
wherein one of the configurations is an open configuration, in which: the two plates are separated apart, the spacing between the plates is not regulated by the spacers, and the sample is deposited on one or both of the plates; and
wherein another of the configurations is a closed configuration which is configured after the sample deposition in the open configuration; and in the closed configuration: at least part of the sample is compressed by the two plates into a layer of uniform thickness, wherein the uniform thickness of the layer is confined by the inner surfaces of the two plates and is regulated by the plates and the spacers, and has an average thickness.

Figure 3:
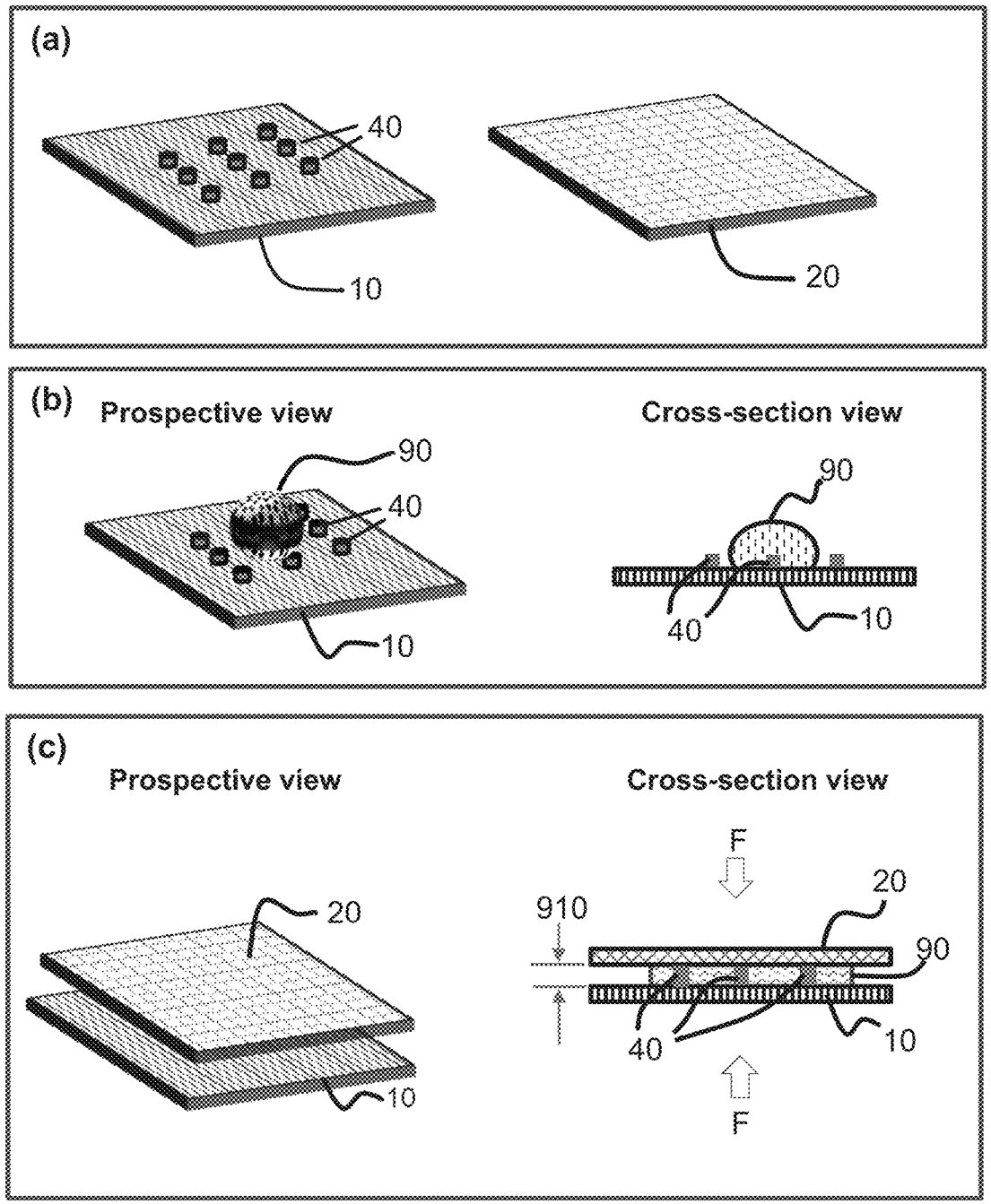
FIG. 3 is a schematic illustration of an embodiment of a QMAX device, which comprises a first plate 10, a second plate 20, and spacers 40.

FIG. 3 shows an embodiment of a QMAX device, which comprises a first plate 10, a second plate 20 and spacers 40. In particular, panel (A) shows the perspective view of a first plate 10 and a second plate 20 wherein the first plate has the spacers 40. It should be noted, however, that the spacers 40 may also be fixed on the second plate 20 (not shown) or on both first plate 10 and second plate 20 (not shown). Panel (B) shows the perspective view and a sectional view of depositing a sample 90 on the first plate 1 at an open configuration. It should be noted, however, that the sample 90 may also be deposited on the second plate 20 (not shown), or on both the first plate 10 and the second plate 20 (not shown). Panel (C) illustrates (i) using the first plate 10 and second plate 20 to spread the sample 90 (the sample flow between the inner surfaces of the plates) and reduce the sample thickness, and (ii) using the spacers and the plate to regulate the sample thickness at the closed configuration of the QMAX device. The inner surfaces of each plate may have one or a plurality of binding sites and or storage sites (not shown).

In some embodiments, the spacers 40 have a predetermined uniform height and a predetermined uniform inter-spacer distance. In the closed configuration, as shown in panel (C) of FIG. 3, the spacing between the plates and the thus the thickness of the sample 910 is regulated by the spacers 40. In some embodiments, the uniform thickness of the sample 910 is substantially similar to the uniform height of the spacers 40.

In some embodiments of the present invention, when the QMAX device is used to obtain the first and/or second concentration, the obtaining step may comprise:
  (a) obtaining the assay device, i.e. the QMAX device;
  (b) depositing the sample on the sample contact area of one or both of the plates in the open configuration;
  (c) compressing a relevant volume of the deposited sample into a layer of uniform thickness by bringing the two plates into the closed configuration;
  (d) determining the amount of the calibration marker in a part or an entirety of the layer of thickness by detecting the calibration marker using the detector;
  (e) estimating the volume of said part or entirety of the layer of thickness by timing the pre-determined uniform height of the spacers and the lateral area of said part or entirety of the layer of uniform thickness;
  (f) obtaining the first or second concentration of the calibration marker by dividing the determined amount of the calibration marker in step (d) by the estimated volume in step (e).

In some embodiments, when the QMAX device is used to obtain the second concentration, the obtaining step may comprise similar steps as above except that the diluted sample is the material to be deposited, compressed, and analyzed instead of the sample.

3. Kit for Dilution Calibration and Sample Analysis

It is yet another aspect of the present invention to provide a kit for dilution calibration and sample analysis for a sample. In some embodiments, the kit comprises a first and a second QMAX devices, and a diluent.

As discussed above, the term "diluent" as used herein refers to the solution that does not contain the analyte of interest and that is added to mix with the initial sample so that the concentration of an analyte of interest is reduced in the diluted sample. In some embodiments, the diluent in the kit is an assay solution that is used for bio/chemical assay of the sample. In some embodiments, the diluent comprises assay reagents for sensing the analyte of interest for the assay. In some embodiments, the diluent comprises reactant(s) that react(s) with the analyte of interest for the treatment of the sample. In some embodiments, the diluent comprises buffer pairs that provide appropriate pH, ionic, and/or osmotic environment for the analysis of the analyte of interest.

It is to be noted that, in some embodiments, the diluent as used herein does not affect the quantity of the calibration marker in the sample. Therefore, the diluent does not contain the calibration marker, nor does it contain reagent(s) that affect the quantity of the calibration marker.

In some embodiments, the first QMAX device is configured to measure a first concentration of a calibration marker in the sample before dilution. In some embodiments, the second QMAX device is configured to measure a second concentration of the calibration marker in the sample after dilution. The calibration marker is an analyte in the sample and the quantity thereof remains constant before and after dilution.

In some embodiments, each of the QMAX devices comprises:
  a first plate, a second plate, and spacers, wherein:
  i. the plates are movable relative to each other into different configurations;
  ii. each of the plates has, on its respective surface, a sample contact area for contacting a sample with an analyte; and
  iii. one or both of the plates comprise spacers that are fixed with a respective plate, wherein the spacers have a predetermined substantially uniform height and a predetermined constant inter-spacer distance and wherein at least one of the spacers is inside the sample contact area.

In some embodiments, one of the configurations is an open configuration, in which: the two plates are separated apart, the spacing between the plates is not regulated by the spacers, and the sample is deposited on one or both of the plates.

In some embodiments, another of the configurations is a closed configuration which is configured after the sample deposition in the open configuration; and in the closed configuration: at least part of the sample is compressed by the two plates into a layer of highly uniform thickness and is substantially stagnant relative to the plates, wherein the uniform thickness of the layer is confined by the inner surfaces of the two plates and is regulated by the plates and the spacers.

Figure 4:
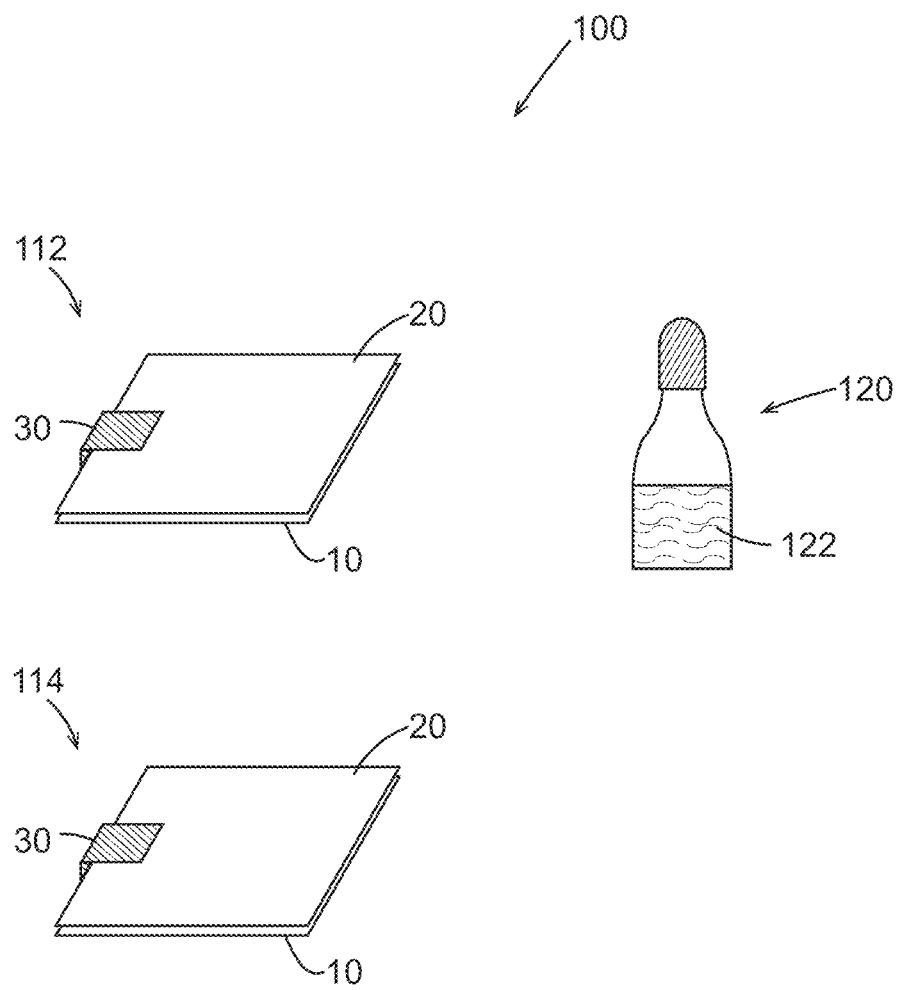
FIG. 4 is a schematic illustration of an embodiment of a kit for dilution calibration and sample analysis, which comprises a first Q card 112, a second Q card 114, and a diluent container 120 that contains a diluent 122.

FIG. 4 schematically illustrates the components of a kit for sample analysis according to some embodiments of the present invention. The kit 100 as shown comprises a first Q card (or "sample card") 112, a second Q card 114, and a diluent container 120 that contains a diluent 122. Both Q cards 112 and 114 comprise a first plate 10, a second 20, spacers (not shown), and a hinge 30 that connects the two plates. The two plates are configured to rotate around the hinge 30, whereby, similar as shown in FIG. 3, they are relative movable to each other into different configurations, including the open and closed configurations as discussed above. It should be noted that the specific design of the Q-card, namely the position, size, and material of the hinge, the rotation mechanisms of the hinge, the relative size of the plates, may differ from what is depicted in the figure depending on the intended use of the Q-card, as long as the hinge 30 permits effective switch between the open configuration and the closed configuration.

In preferred embodiments, the diluent 122 is often provided in a diluent container 120. In some embodiments, the diluent container 120 is used to apply the diluent 122 directly to mix with the initial sample for the dilution. For example, as shown in FIG. 4, the diluent container 120 is a dispensing bottle. It can be squeezed or simply tilted to dispense the diluent liquid from the its dispensing port directly. In some embodiments, the diluent 122 is applied directly onto one or both inner surfaces of the QMAX device before, after, or concurrently with the deposition of the initial sample, so that the initial sample is diluted through the mixture of the two liquids on the inner surfaces of the QMAX device. In other embodiments, it is certain also possible that the diluent 122 is added to the sample before the application of the sample to the QMAX device inside a container other than on the inner surface(s) of the QMAX device. The container 120 may be any type of bottle, can, flask, pot, jug, cup, pouch, or any apparatus that can be used to withhold and dispense a liquid. In some embodiments, the container 120 may be a bottle or pouch. In certain embodiments, the container 120 may include a cap or seal; in certain embodiments, the container 120 may be used to directly dispense/deposit the diluent 122 to a specific location.

4. System for Dilution Calibration

It is yet another aspect of the present invention to provide a system for dilution calibration and sample analysis for a sample. In some embodiments, the system comprises the kit of any prior embodiment and a mobile communication device.

In some embodiments, the mobile communication device comprises software and hardware that are configured to read and analyze signal of the calibration marker and the analyte in the initial sample and diluted sample at the closed configuration of the QMAX devices. In some embodiments, the mobile communication device comprises software and hardware that are configured to determine a first concentration of the calibration marker in the initial sample and a second concentration of the calibration marker in the diluted sample. In some embodiments, the mobile communication device comprises software and hardware that are configured to determine a dilution factor by comparing the first and second concentrations of the calibration marker. In some embodiments, the mobile communication device comprises software and hardware that are configured to calibrate the analysis of the analyte based on the dilution factor.

In some embodiments, the system further comprises an adaptor that is configured to accommodate the device that is in the closed configuration and be engageable to the mobile communication device. In some embodiments, when engaged with the mobile communication device, the adaptor is configured to facilitate the analysis of the analyte, and/or the concentration measurement of the calibration marker in the sample.

In some embodiments, mobile communication device is configured to communicate test results to a medical professional, a medical facility or an insurance company. In some embodiments, the mobile communication device is further configured to communicate information on the subject with the medical professional, medical facility or insurance company. In some embodiments, the mobile communication device is configured to receive a prescription, diagnosis or a recommendation from a medical professional. In some embodiments, the mobile communication device communicates with the remote location via a wifi or cellular network. In some embodiments, the mobile communication device is a mobile phone.

5. Sample

In some embodiments of the present invention, the sample may be one or any combination of a biological sample, an environmental sample, and a foodstuff sample.

The devices and methods herein disclosed may be used for samples such as but not limited to diagnostic sample, clinical sample, environmental sample and foodstuff sample. The types of sample may include but not be limited to the samples listed, described and summarized in the PCT Application (designating U.S.) No. PCT/US2016/045437, which was filed on Aug. 10, 2016, the complete disclosure of which is hereby incorporated by reference.

The devices and methods herein disclosed may be used for the detection, purification and/or quantification of analytes such as but not limited to biomarkers. Examples of the biomarkers may include but not be limited to what is listed, described and summarized in the PCT Application (designating U.S.) No. PCT/US2016/045437, which was filed on Aug. 10, 2016, the complete disclosure of which is hereby incorporated by reference.

In some embodiments, the sample may be obtained from a biological sample such as cells, tissues, bodily fluids, and stool. Typically, samples that are not in liquid form are converted to liquid form before analyzing the sample with the present method. Bodily fluids of interest include but are not limited to, amniotic fluid, aqueous humour, vitreous humour, blood (e.g., whole blood, fractionated blood, plasma, serum, etc.), breast milk, cerebrospinal fluid (CSF), cerumen (earwax), chyle, chime, endolymph, perilymph, feces, gastric acid, gastric juice, lymph, mucus (including nasal drainage and phlegm), pericardial fluid, peritoneal fluid, pleural fluid, pus, rheum, saliva, sebum (skin oil), semen, sputum, sweat, synovial fluid, tears, vomit, urine and exhaled condensate. In particular embodiments, a sample may be obtained from a subject, e.g., a human, and it may be processed prior to use in the subject assay. For example, prior to analysis, the protein/nucleic acid may be extracted from a tissue sample prior to use, methods for which are known. In particular embodiments, the sample may be a clinical sample, e.g., a sample collected from a patient.

In other embodiments, the sample may be obtained from an environmental sample, including, but not limited to: liquid samples from a river, lake, pond, ocean, glaciers, icebergs, rain, snow, sewage, reservoirs, tap water, drinking water, etc.; solid samples from soil, compost, sand, rocks, concrete, wood, brick, sewage, etc.; and gaseous samples from the air, underwater heat vents, industrial exhaust, vehicular exhaust, etc. Typically, samples that are not in liquid form are converted to liquid form before analyzing the sample with the present method.

In yet other embodiments, the sample may be obtained from a food sample that is suitable for animal consumption, e.g., human consumption. A foodstuff sample may include, but not limited to, raw ingredients, cooked food, plant and animal sources of food, preprocessed food as well as partially or fully processed food, etc. Typically, samples that are not in liquid form are converted to liquid form before analyzing the sample with the present method.

6. Calibration Marker

The term "calibration marker" as used herein refers to any analyte contained in the sample, the detectable amount of which is not affected by the addition of the diluent. Here, the term "detectable amount" refers to the amount of the analyte that is detected by the calibration-measuring device provided in the method. Therefore, in some embodiments, under certain circumstances when the diluent is neutral to the sample (i.e. different from the sample with no physical, chemical, or biological impact on the sample whatsoever), the calibration marker may be any analyte contained in the sample, such as, but not limited to, proteins, peptides, DNAs, RNAs, nucleic acids, inorganic molecules and ions, organic small molecules, cells, tissues, viruses, nanoparticles with different shapes, and any combination thereof.

In other embodiments, if the diluent is not neutral to the sample, the calibration marker may be chosen from the analytes contained in the sample based on the physical, chemical, and/or properties of both the analytes and the diluent.

More details of the analytes that may be used as calibration markers have been given in U.S. Provisional Application Ser. No. 62/202,989, filed on Aug. 10, 2015, 62/218,455 filed on Sep. 14, 2015, 62/293,188, filed on Feb. 9, 2016, and 62/305,123, filed on Mar. 8, 2016, the complete disclosures of which are hereby incorporated by references for all purposes.

7. Dilution Calibration and Sample Analysis for Blood Sample

Figure 5:
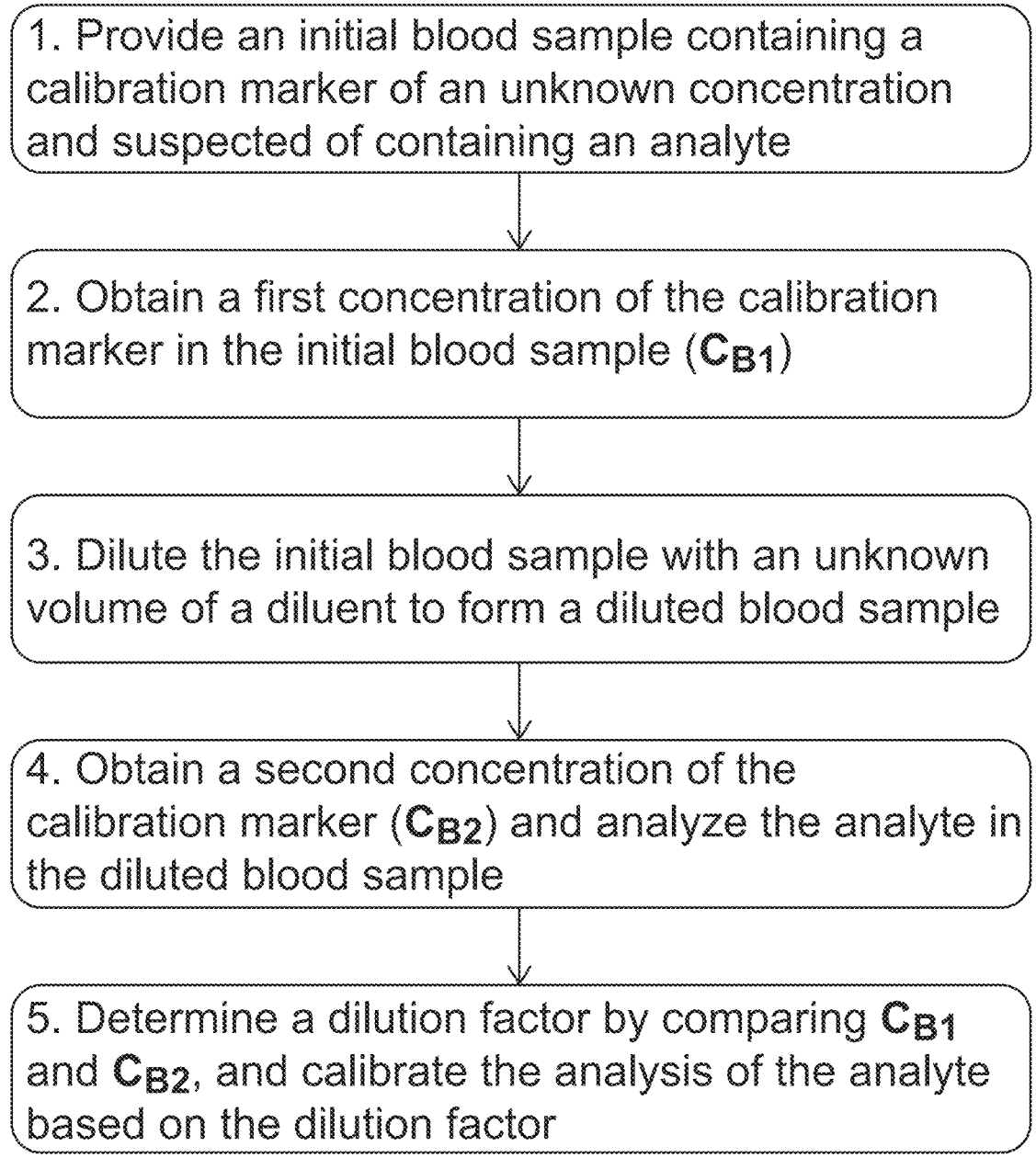
FIG. 5 is a flow diagram of the method of dilution calibration and sample analysis for a blood sample according to some other embodiments of the present invention.

FIG. 5 is a flow diagram of an exemplary embodiment of a method to determine the dilution factor for a blood sample, according to the present invention. The method comprises:

(i) providing an initial blood sample containing a calibration marker and suspected of containing an analyte, the calibration marker having an unknown concentration;

(ii) obtaining a first concentration of the calibration marker ($C_m$) in the initial blood sample;

(iii) diluting the initial blood sample with an unknown volume of a diluent to form a diluted sample;

(iv) obtaining a second concentration of the calibration marker ($C_{B2}$) and analyzing the analyte in the diluted blood sample; and (v) determining a dilution factor for the diluted blood sample by comparing the first concentration $C_{B1}$ and the second concentration $C_{B2}$, and calibrating the analysis of the analyte based on the dilution factor.

As disclosed above, when dilution calibration and sample analysis for a blood sample, the calibration marker may be selected from the any of the analytes contained in the blood sample, as long as the addition of the diluent has no physical, chemical, or biological impact on the detectable amount of the calibration marker, one or any combination of a group, comprising: red blood cells (RBCs), white blood cells (WBCs), and platelets (PLTs).

According to some embodiments of the present invention, a QMAX device may be used to measure the concentration of RBCs, WBCs, and/or PLTs before and after diluting the blood sample. The method of using QMAX device to determine the concentration of RBCs, WBCs, and/or PLTs includes, but not limited to, the ones disclosed in U.S. Provisional Patent Application No. 62/202,989, which was filed on Aug. 10, 2015, U.S. Provisional Patent Application No. 62/218,455, which was filed on Sep. 14, 2015, U.S. Provisional Patent Application No. 62/293,188, which was filed on Feb. 9, 2016, U.S. Provisional Patent Application No. 62/305,123, which was filed on Mar. 8, 2016, U.S. Provisional Patent Application No. 62/369,181, which was filed on Jul. 31, 2016, U.S. Provisional Patent Application No. 62/394,753, which was filed on Sep. 15, 2016, PCT Application (designating U.S.) No. PCT/US2016/045437, which was filed on Aug. 10, 2016, PCT Application (designating U.S.) No. PCT/US2016/051775, which was filed on Sep. 14, 2016, PCT Application (designating U.S.) No. PCT/US2016/051794, which was filed on Sep. 15, 2016, and PCT Application (designating U.S.) No. PCT/US2016/054025, which was filed on Sep. 27, 2016, the complete disclosures of which are hereby incorporated by reference for all purposes.

8. Applications

The devices and methods herein disclosed may be used in various types of biological/chemical sampling, sensing, assays and applications, which include the applications listed, described and summarized in the PCT Application (designating U.S.) No. PCT/US2016/045437, which was filed on Aug. 10, 2016, the complete disclosure of which is hereby incorporated by reference.

9. Mobile Communication

The devices and methods herein disclosed may be used with the facilitation and enhancement of mobile communication devices and systems, which include devices and systems listed, described and summarized in the PCT Application (designating U.S.) No. PCT/US2016/045437, which was filed on Aug. 10, 2016, the complete disclosure of which is hereby incorporated by reference.

10. Examples of Present Invention

(1) Method

A1. A method of dilution calibration and sample analysis, comprising the steps of:
  i) providing an initial sample containing a calibration marker and suspected of containing an analyte, wherein the calibration marker has a first concentration with a known preset value;
  ii) diluting the initial sample with an unknown volume of a diluent to form a diluted sample;
  iii) obtaining a second concentration of the calibration marker and analyzing the analyte in the diluted sample using an assay device; and
  iv) determining a dilution factor for the diluted sample by comparing the first concentration and the second concentration, and calibrating the analysis of the analyte based on the dilution factor.

A2. The method of embodiment A1, wherein the preset value is an estimated normal value, which is different from a true value of the first concentration by less than 5%.

AA1. A method of dilution calibration and sample analysis, comprising the steps of:
  i) providing an initial sample containing a calibration marker and suspected of containing an analyte, wherein the calibration marker has an unknown concentration;
  ii) obtaining a first concentration of the calibration marker in the initial sample
  iii) diluting the initial sample with an unknown volume of a diluent to form a diluted sample;
  iv) obtaining a second concentration of the calibration marker and analyzing the analyte in the diluted sample using an assay device; and
  v) determining a dilution factor for the diluted sample by comparing the first concentration and the second concentration, and calibrating the analysis of the analyte based on the dilution factor.

AA2. The method of embodiment AA1, wherein the step (ii) of obtaining is performed using a first set of the assay device, and the step (iv) of obtaining and analyzing is performed using a second set of the assay device, and wherein the two sets of the assay device are of the same type.

AA3. The method of any prior embodiment, wherein the assay device comprises a QMAX device that comprises:
  a first plate, a second plate, and spacers, wherein:
  iv. the plates are movable relative to each other into different configurations;
  v. each of the plates has, on its respective surface, a sample contact area for contacting a sample suspected of containing an analyte; and
  vi. one or both of the plates comprise spacers that are fixed with a respective plate, wherein the spacers have a predetermined substantially uniform height and a predetermined constant inter-spacer distance and wherein at least one of the spacers is inside the sample contact area;

wherein one of the configurations is an open configuration, in which: the two plates are separated apart, the spacing between the plates is not regulated by the spacers, and the sample is deposited on one or both of the plates; and wherein another of the configurations is a closed configuration which is configured after the sample deposition in the open configuration; and in the closed configuration: at least part of the sample is compressed by the two plates into a layer of uniform thickness, wherein the uniform thickness of the layer is confined by the inner surfaces of the two plates and is regulated by the plates and the spacers, and has an average thickness.

(2) Kit

B1. A kit for dilution calibration and sample analysis, comprising a first and a second QMAX devices, and a diluent, wherein each of the QMAX devices comprises:
 a first plate, a second plate, and spacers, wherein:
  i. the plates are movable relative to each other into different configurations;
  ii. each of the plates has, on its respective surface, a sample contact area for contacting a sample that contains a calibration marker and is suspected of containing an analyte; and
  iii. one or both of the plates comprise spacers that are fixed with a respective plate, wherein the spacers have a predetermined substantially uniform height and a predetermined constant inter-spacer distance and wherein at least one of the spacers is inside the sample contact area;
 wherein one of the configurations is an open configuration, in which: the two plates are separated apart, the spacing between the plates is not regulated by the spacers, and the sample is deposited on one or both of the plates; and
 wherein another of the configurations is a closed configuration which is configured after the sample deposition in the open configuration; and in the closed configuration: at least part of the sample is compressed by the two plates into a layer of uniform thickness, wherein the uniform thickness of the layer is confined by the inner surfaces of the two plates and is regulated by the plates and the spacers, and has an average thickness,
wherein the first QMAX device measures a first concentration of the calibration marker in an initial sample,
wherein the diluent dilutes the initial sample into a diluted sample, and
wherein the second QMAX device measures a second concentration of the calibration marker and analyzes the analyte in the diluted sample.

(3) System

C1. A system for dilution calibration and sample analysis, comprising:
 the kit of any prior embodiment, and a mobile communication device,
 wherein the mobile communication device comprises software and hardware that are configured to:
  (i) read and analyze signal of the calibration marker and the analyte in the initial sample and diluted sample at the closed configuration of the QMAX devices;
  (ii) determine a first concentration of the calibration marker in the initial sample and a second concentration of the calibration marker in the diluted sample;
  (iii) determine a dilution factor by comparing the first and second concentrations of the calibration marker; and
  (iv) calibrate the analysis of the analyte based on the dilution factor.

C2. The system of any prior embodiments, further comprising an adaptor that is configured to accommodate the device that is in the closed configuration and be engageable to the mobile communication device, wherein, when engaged with the mobile communication device, the adaptor is configured to facilitate the analysis of the analyte, and/or the concentration measurement of the calibration marker in the sample.

(4) Method for Blood Sample

D1 A method for dilution calibration and blood sample analysis, comprising:
 i) providing an initial blood sample containing a calibration marker and suspected of containing an analyte, wherein the calibration marker has an unknown concentration;
 ii) obtaining a first concentration of the calibration marker in the initial blood sample;
 iii) diluting the initial blood sample with an unknown volume of a diluent to form a diluted blood sample;
 iv) obtaining a second concentration of the calibration marker and analyzing the analyte in the diluted blood sample using an assay device; and
 v) determining a dilution factor by comparing the first concentration and the second concentration, and calibrating the analysis of the analyte based on the dilution factor.

D2. The method of embodiment D1, wherein the calibration marker is selected from the group consisting of: red blood cells, white blood cells, platelets, and any combination thereof.

(5) Other Embodiments

A3. The method, kit, and system of any prior embodiment, wherein the initial sample is made of a material selected from the group consisting of: cells, tissues, stool, amniotic fluid, aqueous humour, vitreous humour, blood (e.g., whole blood, fractionated blood, plasma, serum, etc.), breast milk, cerebrospinal fluid (CSF), cerumen (earwax), chyle, chime, endolymph, perilymph, feces, gastric acid, gastric juice, lymph, mucus (including nasal drainage and phlegm), pericardial fluid, peritoneal fluid, pleural fluid, pus, rheum, saliva, sebum (skin oil), semen, sputum, sweat, synovial fluid, tears, vomit, urine, and exhaled condensate.

A4 The method, kit, and system of any prior embodiment, wherein the sample is an environmental liquid sample from a source selected from the group consisting of: river, lake, pond, ocean, glaciers, icebergs, rain, snow, sewage, reservoirs, tap water, or drinking water, solid samples from soil, compost, sand, rocks, concrete, wood, brick, sewage, and any combination thereof.

A5 The method, kit, and system of any prior embodiment, wherein the sample is an environmental gaseous sample from a source selected from the group consisting of: the air, underwater heat vents, industrial exhaust, vehicular exhaust, and any combination thereof.

A6 The method, kit, and system of any prior embodiment, wherein the sample is a foodstuff sample selected from the group consisting of: raw ingredients, cooked food, plant and animal sources of food, preprocessed food, and partially or fully processed food, and any combination thereof.

A7 The method, kit, and system of any prior embodiment, wherein the calibration marker is selected from the group consisting of: proteins, peptides, DNAs, RNAs, nucleic acids, inorganic molecules and ions, organic small molecules, cells, tissues, viruses, nanoparticles with different shapes, and any combination thereof.

C3. The system of any prior embodiments, wherein the mobile communication device is configured to communicate test results to a medical professional, a medical facility or an insurance company.

C4. The system of any prior embodiments, wherein the mobile communication device is further configured to communicate information on the subject with the medical professional, medical facility or insurance company.

C5. The system of any prior embodiments, wherein the mobile communication device is configured to receive a prescription, diagnosis or a recommendation from a medical professional.

C6. The system of any prior embodiments, wherein the mobile communication device communicates with the remote location via a wifi or cellular network.

C7. The system of any prior embodiments, wherein the mobile communication device is a mobile phone.

C8. The system of any prior embodiments, wherein the signal of the calibration marker and/or the analyte is selected from the group consisting of:
  i. luminescence selected from photoluminescence, electroluminescence, and electrochemiluminescence;
  ii. light absorption, reflection, transmission, diffraction, scattering, or diffusion;
  iii. surface Raman scattering;
  iv. electrical impedance selected from resistance, capacitance, and inductance;
  v. magnetic relaxivity; and
  vi. any combination of i-v.

E1. The method, kit, and system of any prior embodiment, wherein the spacers regulating the layer of uniform thickness have a filling factor of at least 1%, wherein the filling factor is the ratio of the spacer area in contact with the layer of uniform thickness to the total plate area in contact with the layer of uniform thickness.

E2. The method, kit, and system of any prior embodiment, wherein for spacers regulating the layer of uniform thickness, the Young's modulus of the spacers times the filling factor of the spacers is equal or larger than 10 MPa, wherein the filling factor is the ratio of the spacer area in contact with the layer of uniform thickness to the total plate area in contact with the layer of uniform thickness.

E3. The method, kit, and system of any prior embodiment, wherein for a flexible plate, the thickness of the flexible plate times the Young's modulus of the flexible plate is in the range 60 to 750 GPa-um.

E4. The method, kit, and system of any prior embodiment, wherein for a flexible plate, the fourth power of the inter-spacer-distance (ISD) divided by the thickness of the flexible plate (h) and the Young's modulus (E) of the flexible plate, ISD4/(hE), is equal to or less than 106 um3/GPa.

E5. The method, kit, and system of any prior embodiment, wherein one or both plates comprises a location marker, either on a surface of or inside the plate, that provide information of a location of the plate.

E6. The method, kit, and system of any prior embodiment, wherein one or both plates comprises a scale marker, either on a surface of or inside the plate, that provide information of a lateral dimension of a structure of the sample and/or the plate.

E7. The method, kit, and system of any prior embodiment, wherein one or both plates comprises an imaging marker, either on surface of or inside the plate, that assists an imaging of the sample.

E8. The method, kit, and system of any prior embodiment, wherein the spacers functions as a location marker, a scale marker, an imaging marker, or any combination of thereof.

E9. The method, kit, and system of any prior embodiment, wherein the average thickness of the layer of uniform thickness is in the range of 2 µm to 2.2 µm and the sample is blood.

E10. The method, kit, and system of any prior embodiment, wherein the average thickness of the layer of uniform thickness is in the range of 2.2 µm to 2.6 µm and the sample is blood.

E11. The method, kit, and system of any prior embodiment, wherein the average thickness of the layer of uniform thickness is in the range of 1.8 µm to 2 µm and the sample is blood.

E12. The method, kit, and system of any prior embodiment, wherein the average thickness of the layer of uniform thickness is in the range of 2.6 µm to 3.8 µm and the sample is blood.

E13. The method, kit, and system of any prior embodiment, wherein the average thickness of the layer of uniform thickness is in the range of 1.8 µm to 3.8 µm and the sample is whole blood without a dilution by another liquid.

E14. The method, kit, and system of any prior embodiment, wherein the average thickness of the layer of uniform thickness is about equal to a minimum dimension of an analyte in the sample.

E15. The method, kit, and system of any prior embodiment, wherein the inter-spacer distance is in the range of 7 µm to 50 µm.

E16. The method, kit, and system of any prior embodiment, wherein the inter-spacer distance is in the range of 50 µm to 120 µm.

E17. The method, kit, and system of any prior embodiment, wherein the inter-spacer distance is in the range of 120 µm to 200 µm.

E18. The method, kit, and system of any prior embodiment, wherein the inter-spacer distance is substantially periodic.

E19. The method, kit, and system of any prior embodiment, wherein the spacers are pillars with a cross-sectional shape selected from the group consisting of: round, polygonal, circular, square, rectangular, oval, elliptical, or any combination of the same.

E20. The method, kit, and system of any prior embodiment, wherein the spacers are in pillar shape and have a substantially flat top surface, wherein, for each spacer, the ratio of the lateral dimension of the spacer to its height is at least 1.

E21. The method, kit, and system of any prior embodiment, wherein each spacer has the ratio of the lateral dimension of the spacer to its height is at least 1.

E22. The method, kit, and system of any prior embodiment, wherein the minimum lateral dimension of spacer is less than or substantially equal to the minimum dimension of an analyte in the sample.

E23. The method, kit, and system of any prior embodiment, wherein the minimum lateral dimension of spacer is in the range of 0.5 µm to 100 µm.

E24. The method, kit, and system of any prior embodiment, wherein the minimum lateral dimension of spacer is in the range of 0.5 µm to 10 µm.

E25. The method, kit, and system of any prior embodiment, wherein the layer of uniform thickness sample is uniform over a lateral area that is at least 1 mm².

F1 The device that comprises two plates and spacers, wherein the pressing is by human hand.

F2 The device that comprises two plates and spacers, wherein at least a portion of the inner surface of one plate or both plate is hydrophilic.

F3 The device that comprises two plates and spacers, wherein the inter spacer distance is periodic.

F4 The device that comprises two plates and spacers, wherein the sample is a deposition directly from a subject to the plate without using any transferring devices.

F5 The device that comprises two plates and spacers, wherein after the sample deformation at a closed configuration, the sample maintains the same final sample thickness, when some or all of the compressing forces are removed.

F6 The device that comprises two plates and spacers, wherein the spacers have pillar shape and nearly uniform cross-section.

F7 The device that comprises two plates and spacers, wherein the inter spacer distance (SD) is equal or less than about 120 um (micrometer).

F8 The device that comprises two plates and spacers, wherein the inter spacer distance (SD) is equal or less than about 100 um (micrometer).

F9 The device that comprises two plates and spacers, wherein the fourth power of the inter-spacer-distance (ISD) divided by the thickness (h) and the Young's modulus (E) of the flexible plate (ISD^4/(hE)) is $5 \times 10^6$ um^3/GPa or less.

F10 The device that comprises two plates and spacers, wherein the fourth power of the inter-spacer-distance (ISD) divided by the thickness (h) and the Young's modulus (E) of the flexible plate (ISD^4/(hE)) is $5 \times 10^5$ um³/GPa or less.

F11 The device that comprises two plates and spacers, wherein the spacers have pillar shape, a substantially flat top surface, a predetermined substantially uniform height, and a predetermined constant inter-spacer distance that is at least about 2 times larger than the size of the analyte, wherein the Young's modulus of the spacers times the filling factor of the spacers is equal or larger than 2 MPa, wherein the filling factor is the ratio of the spacer contact area to the total plate area, and wherein, for each spacer, the ratio of the lateral dimension of the spacer to its height is at least 1 (one).

F12 The device that comprises two plates and spacers, wherein the spacers have pillar shape, a substantially flat top surface, a predetermined substantially uniform height, and a predetermined constant inter-spacer distance that is at least about 2 times larger than the size of the analyte, wherein the Young's modulus of the spacers times the filling factor of the spacers is equal or larger than 2 MPa, wherein the filling factor is the ratio of the spacer contact area to the total plate area, and wherein, for each spacer, the ratio of the lateral dimension of the spacer to its height is at least 1 (one), wherein the fourth power of the inter-spacer-distance (ISD) divided by the thickness (h) and the Young's modulus (E) of the flexible plate (ISD^4/(hE)) is $5 \times 10^6$ um^3/GPa or less.

F13 The device of any prior device claim, wherein the ratio of the inter-spacing distance of the spacers to the average width of the spacer is 2 or larger, and the filling factor of the spacers multiplied by the Young's modulus of the spacers is 2 MPa or larger.

F14 The method, kit, and system of any prior embodiments wherein the analytes is the analyte in 5 detection of proteins, peptides, nucleic acids, synthetic compounds, and inorganic compounds.

F15 The method, kit, and system of any prior embodiments wherein the sample is a biological sample selected from amniotic fluid, aqueous humour, vitreous humour, blood (e.g., whole blood, fractionated blood, plasma or serum), breast milk, cerebrospinal fluid (CSF), cerumen (earwax), chyle, chime, endolymph, perilymph, feces, breath, gastric acid, gastric juice, lymph, mucus (including nasal drainage and phlegm), pericardial fluid, peritoneal fluid, pleural fluid, pus, rheum, saliva, exhaled breath condensates, sebum, semen, sputum, sweat, synovial fluid, tears, vomit, and urine.

F16 The method, kit, and system of any prior embodiments wherein the spacers have a shape of pillars and a ratio of the width to the height of the pillar is equal or larger than one.

F17 The method of any prior claim, wherein the sample that is deposited on one or both of the plates has an unknown volume.

F18 The method, kit, and system of any prior embodiments wherein the spacers have a shape of pillar, and the pillar has substantially uniform cross-section.

F19 The method, kit, and system of any prior embodiments wherein the samples are for the detection, purification and quantification of chemical compounds or biomolecules that correlates with the stage of certain diseases.

F20 The method, kit, and system of any prior embodiments wherein the samples is related to infectious and parasitic disease, injuries, cardiovascular disease, cancer, mental disorders, neuropsychiatric disorders, pulmonary diseases, renal diseases, and other and organic diseases.

F21 The method, kit, and system of any prior embodiments wherein the samples are related to the detection, purification and quantification of microorganism.

F22 The method, kit, and system of any prior embodiments wherein the samples is related to virus, fungus and bacteria from environment, e.g., water, soil, or biological samples.

F23 The method, kit, and system of any prior embodiments wherein the samples is related to the detection, quantification of chemical compounds or biological samples that pose hazard to food safety or national security, e.g. toxic waste, anthrax.

F24 The method, kit, and system of any prior embodiments wherein the samples are related to quantification of vital parameters in medical or physiological monitor.

F25 The method, kit, and system of any prior embodiments wherein the samples are related to glucose, blood, oxygen level, total blood count.

F26 The method, kit, and system of any prior embodiments wherein the samples are related to the detection and quantification of specific DNA or RNA from biosamples.

F27 The method, kit, and system of any prior embodiments wherein the samples are related to the sequencing and comparing of genetic sequences in DNA in the chromosomes and mitochondria for genome analysis.

F28 The method, kit, and system of any prior embodiments wherein the samples are related to detect reaction products, e.g., during synthesis or purification of pharmaceuticals.

F29 The method, kit, and system of any prior embodiments wherein the samples are cells, tissues, bodily fluids, and stool.

F30 The method, kit, and system of any prior embodiments wherein the sample is the sample in the detection of proteins, peptides, nucleic acids, synthetic compounds, inorganic compounds.

F31 The method, kit, and system of any prior embodiments wherein the sample is the sample in the fields of human, veterinary, agriculture, foods, environments, and drug testing.

F32 The method or device of any prior claim, wherein the sample is a biological sample is selected from blood, serum, plasma, a nasal swab, a nasopharyngeal wash, saliva, urine, gastric fluid, spinal fluid, tears, stool, mucus, sweat, earwax, oil, a glandular secretion, cerebral spinal fluid, tissue, semen, vaginal fluid, interstitial fluids derived from tumorous tissue, ocular fluids, spinal fluid, a throat swab, breath, hair, finger nails, skin, biopsy, placental fluid, amniotic fluid, cord blood, lymphatic fluids, cavity fluids, sputum, pus, microbiota, meconium, breast milk, exhaled condensate nasopharyngeal wash, nasal swab, throat swab, stool samples, hair, finger nail, ear wax, breath, connective tissue, muscle tissue, nervous tissue, epithelial tissue, cartilage, cancerous sample, or bone.

Example: Determination of Dilution Factor for Human Blood Sample Using RBCs and WBCs As disclosed in the experiments below, exemplary devices and methods for dilution calibration and sample analysis for a human blood sample have been achieved. In these experiments, a fresh human blood sample was obtained and diluted in saline solution by different pre-determined dilution factors. RBCs and WBCs were used as calibration markers respectively to determine the dilution factor in each diluted blood sample. Briefly, their concentrations in all samples, including the undiluted and diluted blood samples, were measured using QMAX devices. Dilution factor for each diluted sample was hence determined using the measured concentrations of RBCs and WBCs, respectively. Last, to examine the quality of the calculated dilution factors, they were compared against the pre-determined dilution factors for each diluted sample. The fact that the calculated dilution factors all showed close resemblance to the pre-determined dilution factors for each diluted sample clearly testifies to the validity of the methods and devices provided in the present invention.

E-1. Materials and Methods

QMAX device: The QMAX device used in this experiment contained: 1) a planar glass substrate plate (25.4 mm×25.4 mm surface, 1 mm thick), and 2) an X-plate that is a planar PMMA plate (25.4 mm×25.4 mm surface, 175 µm thick) having, on one of its surfaces, a periodical array of spacer pillars with 80 µm spacing distance. Each spacer pillar is in rectangular shape with nearly uniform cross-section and rounded corners (lateral surface: 30 µm×40 µm, height: 2 µm).

Acridine orange dye: Acridine orange (AO) is a stable dye that has natural affinity for nucleic acids. When binding to DNA, AO intercalates with DNA as a monomer and yields intense green fluorescence under blue excitation. (470 nm excitation, 525 nm green emission for white blood cells (WBCs)). When binding to RNAs and proteins it forms an electrostatic complex in a polymeric form that yields red fluorescence under blue excitation. (470 nm excitation, 685 nm red emission for WBCs and platelets (PLTs)). As a result, red blood cells (RBCs) were not stained because they have no nuclei and therefore little nucleic acids; WBCs were strongly stained because they have significant amount of nucleic acids; PLTs were weakly stained for the slight amount of RNAs they have.

Sample Processing, Dilution and Imaging: Fresh human blood sample was obtained by pricking a finger of a human subject and then stained with AO dye. Briefly, it was mixed with AO (100 µg/mL in PBS) at 1:1 ratio for 1 min.

After staining, the sample was split into five parts, among which one part was labeled "Undiluted sample", and each of the remaining parts was diluted with 0.9% sodium chloride solution at one of the following ratios: 1:2 ("2× diluted sample"), 1:5 ("5× diluted sample"), 1:10 ("10× diluted sample"), 1:20 ("20× diluted sample").

1 µL of each blood sample was transferred onto the center of the substrate plate using an Eppendorf pipette, and an X-plate was then placed on top of the substrate plate that bears the blood drop, with the spacer pillars facing toward the blood drop on the substrate plate, covering most area of the substrate plate. Next, the two plates were pressed against each other by a human hand uniformly for 10 sec and then released, after which the two plates were self-held in the same configuration, likely due to forces between the two plates, like capillary force.

An imaging system, composed of a commercial DSLR camera (Nikon), two filters, a light source and a magnification/focus lens set, was used to take pictures of the blood sample deposited in between the two plates in bright field mode and in fluorescence mode, to count RBCs and WBCs, respectively. In bright field mode, a broadband white light Xenon lamp source without any filter was used. In fluorescence mode, the excitation source was a Xenon lamp with a 470±20 nm excitation filter (Thorlabs), and the emission filter was a 500 nm long pass filter (Thorlabs).

E-2. Results and Discussion

Here dilution factor for each diluted human blood sample was determined using the methods and QMAX devices provided by some embodiments of the present invention.

1. The concentrations of RBCs and WBCs in each sample, including the undiluted and the serially diluted samples, were measured using QMAX devices.

Figure 6:
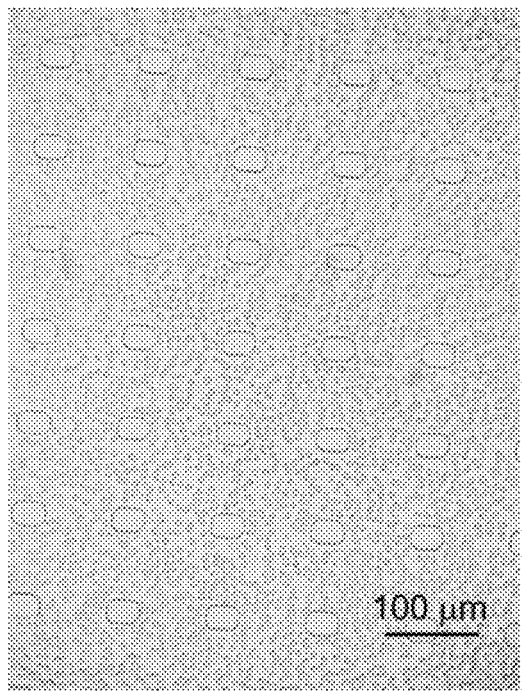
FIG. 6 shows representative images of Undiluted (a) and 10X diluted (b) human blood sample deposited in CROF device in its closed configuration under bright field illumination (scale bar: 100 μm).
Figure 6:
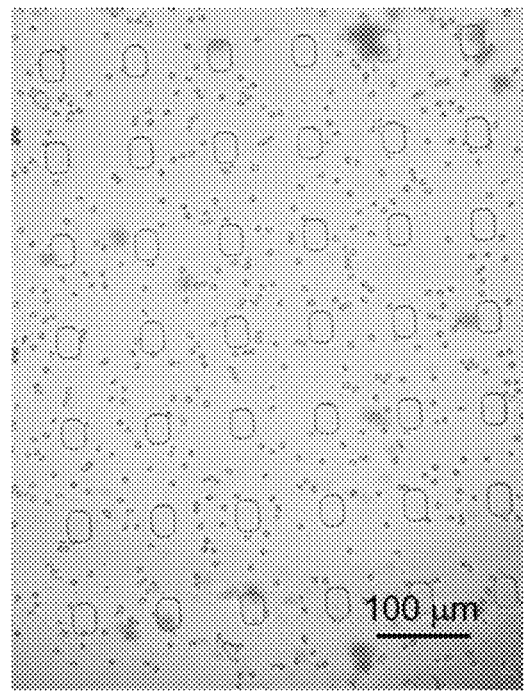

Number: RBCs deposited in the QMAX devices were counted in a relevant volume in bright field mode, while WBCs were counted in fluorescence mode. FIG. 6 shows representative images of Undiluted (a) and 10X diluted (b) samples obtained in bright field mode. From the images, RBCs are readily recognizable, as defined by their contrasted dark round boundary and relatively brighter center, while the periodically aligned rounded rectangles are the spacer pillars on the X-plate. It is to be noted that the number of RBCs in FIG. 6(*a*) clearly appears less than FIG. 6(*b*), suggesting that 10× diluted sample was indeed more diluted than Undiluted sample, with a lower concentration of RBCs.

Volume: Given that the distance between the two plates was the height of the pillars when the two plates were hand-pressed to enter the device's closed configuration, the relevant volume of the deposited sample were readily calculated based on the pre-determined size, height, and pattern of the spacer pillar array.

Concentration: The concentration of RBCs ([RBCs]) in each sample was then quantified as the quotient of the measured number of RBCs and the relevant volume, as summarized in Table 1, and the concentration of WBCs ([WBCs]) in each sample was quantified similarly using the count of WBCs in the relevant volume (Table 2).

2. Dilution factor for each diluted sample was determined using the concentrations of RBCs and WBCs, respectively (Table 1 and 2). Specifically, to calculate dilution factor based on RBCs, the measured concentration of RBCs in each diluted sample was compared with their concentration in the undiluted sample (Table 1, N/A=not applicable). For dilution factor from WBCs, the measured concentration of WBCs in each diluted sample was compared with their concentration in the undiluted sample (Table 2, N/A=not applicable).

TABLE 1

Concentrations of RBCs and calculated dilution factors

| | [RBCs] (/μL) | Dilution factor calculated from RBCs | Percentage Difference (%) |
|---|---|---|---|
| Undiluted | 4.90E+06 | N/A | N/A |
| 2X | 2.44E+06 | 1:2.01 | 0.41 |
| 5X | 9.70E+05 | 1:5.05 | 1.03 |
| 10X | 5.00E+05 | 1:9.80 | 2.00 |
| 20X | 2.50E+05 | 1:19.6 | 2.00 |

3. The dilution factors calculated from RBCs and WBCs were then compared against the pre-determined dilution factor in each sample, respectively. The percentage difference for method using RBCs (|dilution factor calculated from RBCs−predetermined dilution factor|/predetermined dilution factor*100%) was calculated for each diluted sample (Table 2). Percentage differences for method using WBCs (|dilution factor calculated from WBCs−predetermined dilution factor|/predetermined dilution factor*100%) were also calculated (Table 2). As shown in Table 1 and 2, none of the percentage differences exceeded 5%, demonstrating the validity of the methods and device for determining dilution factor provided in the present invention.

TABLE 2

Concentrations of WBCs and calculated dilution factors

| | [WBCs] (/μL) | Dilution factor calculated from WBCs | Percentage Difference (%) |
|---|---|---|---|
| Undiluted | 8792 | N/A | N/A |
| 2X | 4432 | 1:1.98 | 0.81 |
| 5X | 1770 | 1:4.97 | 0.66 |
| 10X | 870 | 1:10.1 | 1.06 |
| 20X | 420 | 1:20.9 | 4.67 |

To summarize, the methods and device for dilution calibration and sample analysis in human blood sample were examined in the above exemplary experiments, involving the use of RBCs and WBCs as calibration markers separately and the use of QMAX devices. The resultant dilution factors showed clear resemblance to the pre-determined dilution factor for each diluted sample, demonstrating the validity of the method and device provided in the present invention.

11. Related Documents

The present invention includes a variety of embodiments, which can be combined in multiple ways as long as the various components do not contradict one another. The embodiments should be regarded as a single invention file: each filing has other filing as the references and is also referenced in its entirety and for all purpose, rather than as a discrete independent. These embodiments include not only the disclosures in the current file, but also the documents that are herein referenced, incorporated, or to which priority is claimed.

(1) Definitions

The terms used in describing the devices, systems, and methods herein disclosed are defined in the current application, or in PCT Application (designating U.S.) Nos. PCT/US2016/045437 and PCT/US0216/051775, which were respectively filed on Aug. 10, 2016 and Sep. 14, 2016, U.S. Provisional Application No. 62/456,065, which was filed on Feb. 7, 2017, U.S. Provisional Application No. 62/456,287, which was filed on Feb. 8, 2017, and U.S. Provisional Application No. 62/456,504, which was filed on Feb. 8, 2017, all of which applications are incorporated herein in their entireties for all purposes.

The terms "CROF Card (or card)", "COF Card", "QMAX-Card", "Q-Card", "CROF device", "COF device", "QMAX-device", "CROF plates", "COF plates", and "QMAX-plates" are interchangeable, except that in some embodiments, the COF card does not comprise spacers; and the terms refer to a device that comprises a first plate and a second plate that are movable relative to each other into different configurations (including an open configuration and a closed configuration), and that comprises spacers (except some embodiments of the COF card) that regulate the spacing between the plates. The term "X-plate" refers to one of the two plates in a CROF card, wherein the spacers are fixed to this plate. More descriptions of the COF Card, CROF Card, and X-plate are given in the provisional application Ser. Nos. 62/456,065, filed on Feb. 7, 2017, which is incorporated herein in its entirety for all purposes.

(2) Q-Card, Spacer and Uniform Sample Thickness

The devices, systems, and methods herein disclosed can include or use Q-cards, spacers, and uniform sample thickness embodiments for sample detection, analysis, and quantification. In some embodiments, the Q-card comprises spacers, which help to render at least part of the sample into a layer of high uniformity. The structure, material, function, variation and dimension of the spacers, as well as the uniformity of the spacers and the sample layer, are herein disclosed, or listed, described, and summarized in PCT Application (designating U.S.) Nos. PCT/US2016/045437 and PCT/US0216/051775, which were respectively filed on Aug. 10, 2016 and Sep. 14, 2016, U.S. Provisional Application No. 62/456,065, which was filed on Feb. 7, 2017, U.S. Provisional Application No. 62/456,287, which was filed on Feb. 8, 2017, and U.S. Provisional Application No. 62/456,504, which was filed on Feb. 8, 2017, all of which applications are incorporated herein in their entireties for all purposes.

(3) Hinges, Opening Notches, Recessed Edge and Sliders

The devices, systems, and methods herein disclosed can include or use Q-cards for sample detection, analysis, and quantification. In some embodiments, the Q-card comprises hinges, notches, recesses, and sliders, which help to facilitate the manipulation of the Q card and the measurement of the samples. The structure, material, function, variation and dimension of the hinges, notches, recesses, and sliders are herein disclosed, or listed, described, and summarized in PCT Application (designating U.S.) Nos. PCT/US2016/045437 and PCT/US0216/051775, which were respectively filed on Aug. 10, 2016 and Sep. 14, 2016, U.S. Provisional Application No. 62/456,065, which was filed on Feb. 7, 2017, U.S. Provisional Application No. 62/456,287, which was filed on Feb. 8, 2017, and U.S. Provisional Application No. 62/456,504, which was filed on Feb. 8, 2017, all of which applications are incorporated herein in their entireties for all purposes.

(4) Q-Card, Sliders, and Smartphone Detection System

The devices, systems, and methods herein disclosed can include or use Q-cards for sample detection, analysis, and quantification. In some embodiments, the Q-cards are used together with sliders that allow the card to be read by a smartphone detection system. The structure, material, function, variation, dimension and connection of the Q-card, the sliders, and the smartphone detection system are herein disclosed, or listed, described, and summarized in PCT Application (designating U.S.) Nos. PCT/US2016/045437 and PCT/US0216/051775, which were respectively filed on Aug. 10, 2016 and Sep. 14, 2016, U.S. Provisional Application No. 62/456,065, which was filed on Feb. 7, 2017, U.S. Provisional Application No. 62/456,287, which was filed on Feb. 8, 2017, and U.S. Provisional Application No. 62/456,504, which was filed on Feb. 8, 2017, all of which applications are incorporated herein in their entireties for all purposes.

(5) Detection Methods

The devices, systems, and methods herein disclosed can include or be used in various types of detection methods. The detection methods are herein disclosed, or listed, described, and summarized in PCT Application (designating U.S.) Nos. PCT/US2016/045437 and PCT/US0216/051775, which were respectively filed on Aug. 10, 2016 and Sep. 14, 2016, U.S. Provisional Application No. 62/456,065, which was filed on Feb. 7, 2017, U.S. Provisional Application No. 62/456,287, which was filed on Feb. 8, 2017, and U.S. Provisional Application No. 62/456,504, which was filed on Feb. 8, 2017, all of which applications are incorporated herein in their entireties for all purposes.

(6) Labels, Capture Agent and Detection Agent

The devices, systems, and methods herein disclosed can employ various types of labels, capture agents, and detection agents that are used for analytes detection. The labels are herein disclosed, or listed, described, and summarized in PCT Application (designating U.S.) Nos. PCT/US2016/045437 and PCT/US0216/051775, which were respectively filed on Aug. 10, 2016 and Sep. 14, 2016, U.S. Provisional Application No. 62/456,065, which was filed on Feb. 7, 2017, U.S. Provisional Application No. 62/456,287, which was filed on Feb. 8, 2017, and U.S. Provisional Application No. 62/456,504, which was filed on Feb. 8, 2017, all of which applications are incorporated herein in their entireties for all purposes.

(7) Analytes

The devices, systems, and methods herein disclosed can be applied to manipulation and detection of various types of analytes (including biomarkers). The analytes and are herein disclosed, or listed, described, and summarized in PCT Application (designating U.S.) Nos. PCT/US2016/045437 and PCT/US0216/051775, which were respectively filed on Aug. 10, 2016 and Sep. 14, 2016, U.S. Provisional Application No. 62/456,065, which was filed on Feb. 7, 2017, U.S. Provisional Application No. 62/456,287, which was filed on Feb. 8, 2017, and U.S. Provisional Application No. 62/456,504, which was filed on Feb. 8, 2017, all of which applications are incorporated herein in their entireties for all purposes.

(8) Applications (Field and Samples)

The devices, systems, and methods herein disclosed can be used for various applications (fields and samples). The applications are herein disclosed, or listed, described, and summarized in PCT Application (designating U.S.) Nos. PCT/US2016/045437 and PCT/US0216/051775, which were respectively filed on Aug. 10, 2016 and Sep. 14, 2016, U.S. Provisional Application No. 62/456,065, which was filed on Feb. 7, 2017, U.S. Provisional Application No. 62/456,287, which was filed on Feb. 8, 2017, and U.S. Provisional Application No. 62/456,504, which was filed on Feb. 8, 2017, all of which applications are incorporated herein in their entireties for all purposes.

(9) Cloud

The devices, systems, and methods herein disclosed can employ cloud technology for data transfer, storage, and/or analysis. The related cloud technologies are herein disclosed, or listed, described, and summarized in PCT Application (designating U.S.) Nos. PCT/US2016/045437 and PCT/US0216/051775, which were respectively filed on Aug. 10, 2016 and Sep. 14, 2016, U.S. Provisional Application No. 62/456,065, which was filed on Feb. 7, 2017, U.S. Provisional Application No. 62/456,287, which was filed on Feb. 8, 2017, and U.S. Provisional Application No. 62/456,504, which was filed on Feb. 8, 2017, all of which applications are incorporated herein in their entireties for all purposes.

Additional Notes

Further examples of inventive subject matter according to the present disclosure are described in the following enumerated paragraphs.

It must be noted that as used herein and in the appended claims, the singular forms "a", "an", and "the" include plural referents unless the context clearly dictates otherwise, e.g., when the word "single" is used. For example, reference to "an analyte" includes a single analyte and multiple analytes, reference to "a capture agent" includes a single capture agent and multiple capture agents, reference to "a detection agent" includes a single detection agent and multiple detection agents, and reference to "an agent" includes a single agent and multiple agents.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function. Similarly, subject matter that is recited as being configured to perform a particular function may additionally or alternatively be described as being operative to perform that function.

As used herein, the phrase, "for example," the phrase, "as an example," and/or simply the terms "example" and "exemplary" when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, the phrases "at least one of" and "one or more of," in reference to a list of more than one entity, means any one or more of the entity in the list of entity, and is not limited to at least one of each and every entity specifically listed within the list of entity. For example, "at least one of A and B" (or, equivalently, "at least one of A or B," or, equivalently, "at least one of A and/or B") may refer to A alone, B alone, or the combination of A and B.

As used herein, the term "and/or" placed between a first entity and a second entity means one of (1) the first entity, (2) the second entity, and (3) the first entity and the second entity. Multiple entity listed with "and/or" should be construed in the same manner, i.e., "one or more" of the entity so conjoined. Other entity may optionally be present other than the entity specifically identified by the "and/or" clause, whether related or unrelated to those entities specifically identified.

Where numerical ranges are mentioned herein, the invention includes embodiments in which the endpoints are included, embodiments in which both endpoints are excluded, and embodiments in which one endpoint is included and the other is excluded. It should be assumed that both endpoints are included unless indicated otherwise. Furthermore, unless otherwise indicated or otherwise evident from the context and understanding of one of ordinary skill in the art.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

1. Samples

The devices, apparatus, systems, and methods herein disclosed can be used for samples such as but not limited to diagnostic samples, clinical samples, environmental samples and foodstuff samples. The types of sample include but are not limited to the samples listed, described and/or summarized in PCT Application (designating U.S.) Nos. PCT/US2016/045437 and PCT/US0216/051775, which were respectively filed on Aug. 10, 2016 and Sep. 14, 2016, and are hereby incorporated by reference by their entireties.

For example, in some embodiments, the devices, apparatus, systems, and methods herein disclosed are used for a sample that includes cells, tissues, bodily fluids and/or a mixture thereof. In some embodiments, the sample comprises a human body fluid. In some embodiments, the sample comprises at least one of cells, tissues, bodily fluids, stool, amniotic fluid, aqueous humour, vitreous humour, blood, whole blood, fractionated blood, plasma, serum, breast milk, cerebrospinal fluid, cerumen, chyle, chime, endolymph, perilymph, feces, gastric acid, gastric juice, lymph, mucus, nasal drainage, phlegm, pericardial fluid, peritoneal fluid, pleural fluid, pus, rheum, saliva, sebum, semen, sputum, sweat, synovial fluid, tears, vomit, urine, and exhaled breath condensate.

In some embodiments, the devices, apparatus, systems, and methods herein disclosed are used for an environmental sample that is obtained from any suitable source, such as but not limited to: river, lake, pond, ocean, glaciers, icebergs, rain, snow, sewage, reservoirs, tap water, drinking water, etc.; solid samples from soil, compost, sand, rocks, concrete, wood, brick, sewage, etc.; and gaseous samples from the air, underwater heat vents, industrial exhaust, vehicular exhaust, etc. In certain embodiments, the environmental sample is fresh from the source; in certain embodiments, the environmental sample is processed. For example, samples that are not in liquid form are converted to liquid form before the subject devices, apparatus, systems, and methods are applied.

In some embodiments, the devices, apparatus, systems, and methods herein disclosed are used for a foodstuff sample, which is suitable or has the potential to become suitable for animal consumption, e.g., human consumption. In some embodiments, a foodstuff sample includes raw ingredients, cooked or processed food, plant and animal sources of food, preprocessed food as well as partially or fully processed food, etc. In certain embodiments, samples that are not in liquid form are converted to liquid form before the subject devices, apparatus, systems, and methods are applied.

The subject devices, apparatus, systems, and methods can be used to analyze any volume of the sample. Examples of the volumes include, but are not limited to, about 10 mL or less, 5 mL or less, 3 mL or less, 1 microliter ($\mu$L, also "uL" herein) or less, 500 $\mu$L or less, 300 $\mu$L or less, 250 $\mu$L or less, 200 $\mu$L or less, 170 $\mu$L or less, 150 $\mu$L or less, 125 $\mu$L or less, 100 $\mu$L or less, 75 $\mu$L or less, 50 $\mu$L or less, 25 $\mu$L or less, 20 $\mu$L or less, 15 $\mu$L or less, 10 $\mu$L or less, 5 $\mu$L or less, 3 $\mu$L or less, 1 $\mu$L or less, 0.5 $\mu$L or less, 0.1 $\mu$L or less, 0.05 $\mu$L or less, 0.001 $\mu$L or less, 0.0005 $\mu$L or less, 0.0001 $\mu$L or less, 10 pL or less, 1 pL or less, or a range between any two of the values.

In some embodiments, the volume of the sample includes, but is not limited to, about 100 $\mu$L or less, 75 $\mu$L or less, 50 $\mu$L or less, 25 $\mu$L or less, 20 $\mu$L or less, 15 $\mu$L or less, 10 $\mu$L or less, 5 $\mu$L or less, 3 $\mu$L or less, 1 $\mu$L or less, 0.5 $\mu$L or less, 0.1 $\mu$L or less, 0.05 $\mu$L or less, 0.001 $\mu$L or less, 0.0005 $\mu$L or less, 0.0001 $\mu$L or less, 10 $\mu$L or less, 1 $\mu$L or less, or a range between any two of the values. In some embodiments, the volume of the sample includes, but is not limited to, about 10 $\mu$L or less, 5 $\mu$L or less, 3 $\mu$L or less, 1 $\mu$L or less, 0.5 $\mu$L or less, 0.1 $\mu$L or less, 0.05 $\mu$L or less, 0.001 $\mu$L or less, 0.0005 $\mu$L or less, 0.0001 $\mu$L or less, 10 pL or less, 1 pL or less, or a range between any two of the values.

In some embodiments, the amount of the sample is about a drop of liquid. In certain embodiments, the amount of sample is the amount collected from a pricked finger or fingerstick. In certain embodiments, the amount of sample is the amount collected from a microneedle, micropipette or a venous draw.

In certain embodiments, the sample holder is configured to hold a fluidic sample. In certain embodiments, the sample holder is configured to compress at least part of the fluidic sample into a thin layer. In certain embodiments, the sample holder comprises structures that are configured to heat and/or cool the sample. In certain embodiments, the heating source provides electromagnetic waves that can be absorbed by certain structures in the sample holder to change the temperature of the sample. In certain embodiments, the signal sensor is configured to detect and/or measure a signal from the sample. In certain embodiments, the signal sensor is configured to detect and/or measure an analyte in the sample. In certain embodiments, the heat sink is configured to absorb heat from the sample holder and/or the heating source. In certain embodiments, the heat sink comprises a chamber that at least partly enclose the sample holder.

2. Applications

The devices, apparatus, systems, and methods herein disclosed can be used in various types of biological/chemical sampling, sensing, assays and applications, which include the applications listed, described and/or summarized in PCT Application (designating U.S.) No. PCT/US2016/045437, which was filed on Aug. 10, 2016, and is hereby incorporated by reference by its entirety.

In some embodiments, the devices, apparatus, systems, and methods herein disclosed are used in a variety of different application in various field, wherein determination of the presence or absence, quantification, and/or amplification of one or more analytes in a sample are desired. For example, in certain embodiments the subject devices, apparatus, systems, and methods are used in the detection of proteins, peptides, nucleic acids, synthetic compounds, inorganic compounds, organic compounds, bacteria, virus, cells, tissues, nanoparticles, and other molecules, compounds, mixtures and substances thereof. The various fields in which the subject devices, apparatus, systems, and methods can be used include, but are not limited to: diagnostics, management, and/or prevention of human diseases and conditions, diagnostics, management, and/or prevention of veterinary diseases and conditions, diagnostics, management, and/or prevention of plant diseases and conditions, agricultural uses, veterinary uses, food testing, environments testing and decontamination, drug testing and prevention, and others.

The applications of the present invention include, but are not limited to: (a) the detection, purification, quantification, and/or amplification of chemical compounds or biomolecules that correlates with certain diseases, or certain stages of the diseases, e.g., infectious and parasitic disease, injuries, cardiovascular disease, cancer, mental disorders, neuropsychiatric disorders and organic diseases, e.g., pulmonary diseases, renal diseases, (b) the detection, purification, quantification, and/or amplification of cells and/or microorganism, e.g., virus, fungus and bacteria from the environment, e.g., water, soil, or biological samples, e.g., tissues, bodily fluids, (c) the detection, quantification of chemical compounds or biological samples that pose hazard to food safety, human health, or national security, e.g. toxic waste, anthrax, (d) the detection and quantification of vital parameters in medical or physiological monitor, e.g., glucose, blood oxygen level, total blood count, (e) the detection and quantification of specific DNA or RNA from biological samples, e.g., cells, viruses, bodily fluids, (f) the sequencing and comparing of genetic sequences in DNA in the chromosomes and mitochondria for genome analysis or (g) the detection and quantification of reaction products, e.g., during synthesis or purification of pharmaceuticals.

In some embodiments, the subject devices, apparatus, systems, and methods are used in the detection of nucleic acids, proteins, or other molecules or compounds in a sample. In certain embodiments, the devices, apparatus, systems, and methods are used in the rapid, clinical detection and/or quantification of one or more, two or more, or three or more disease biomarkers in a biological sample, e.g., as being employed in the diagnosis, prevention, and/or management of a disease condition in a subject. In certain embodiments, the devices, apparatus, systems, and methods are used in the detection and/or quantification of one or more, two or more, or three or more environmental markers in an environmental sample, e.g. sample obtained from a river, ocean, lake, rain, snow, sewage, sewage processing runoff, agricultural runoff, industrial runoff, tap water or drinking water. In certain embodiments, the devices, apparatus, systems, and methods are used in the detection and/or quantification of one or more, two or more, or three or more foodstuff marks from a food sample obtained from tap water, drinking water, prepared food, processed food or raw food.

In some embodiments, the subject device is part of a microfluidic device. In some embodiments, the subject devices, apparatus, systems, and methods are used to detect a fluorescence or luminescence signal. In some embodiments, the subject devices, apparatus, systems, and methods include, or are used together with, a communication device, such as but not limited to: mobile phones, tablet computers and laptop computers. In some embodiments, the subject devices, apparatus, systems, and methods include, or are used together with, an identifier, such as but not limited to an optical barcode, a radio frequency ID tag, or combinations thereof.

In some embodiments, the sample is a diagnostic sample obtained from a subject, the analyte is a biomarker, and the measured amount of the analyte in the sample is diagnostic of a disease or a condition. In some embodiments, the subject devices, systems and methods further include receiving or providing to the subject a report that indicates the measured amount of the biomarker and a range of measured values for the biomarker in an individual free of or at low risk of having the disease or condition, wherein the measured amount of the biomarker relative to the range of measured values is diagnostic of a disease or condition.

In some embodiments, the sample is an environmental sample, and wherein the analyte is an environmental marker. In some embodiments, the subject devices, systems and methods includes receiving or providing a report that indicates the safety or harmfulness for a subject to be exposed to the environment from which the sample was obtained. In some embodiments, the subject devices, systems and methods include sending data containing the measured amount of the environmental marker to a remote location and receiving a report that indicates the safety or harmfulness for a subject to be exposed to the environment from which the sample was obtained.

In some embodiments, the sample is a foodstuff sample, wherein the analyte is a foodstuff marker, and wherein the amount of the foodstuff marker in the sample correlate with safety of the foodstuff for consumption. In some embodiments, the subject devices, systems and methods include receiving or providing a report that indicates the safety or harmfulness for a subject to consume the foodstuff from which the sample is obtained. In some embodiments, the subject devices, systems and methods include sending data containing the measured amount of the foodstuff marker to a remote location and receiving a report that indicates the safety or harmfulness for a subject to consume the foodstuff from which the sample is obtained.

3. Analytes, Biomarkers, and Diseases

The devices, apparatus, systems, and methods herein disclosed can be used for the detection, purification and/or quantification of various analytes. In some embodiments, the analytes are biomarkers that associated with various diseases. In some embodiments, the analytes and/or biomarkers are indicative of the presence, severity, and/or stage of the diseases. The analytes, biomarkers, and/or diseases that can be detected and/or measured with the devices, apparatus, systems, and/or method of the present invention include the analytes, biomarkers, and/or diseases listed, described and/or summarized in PCT Application (designating U.S.) Nos. PCT/US2016/045437 filed on Aug. 10, 2016, and PCT Application No. PCT/US2016/054025 filed on Sep. 27, 2016, and U.S. Provisional Application Nos. 62/234,538 filed on Sep. 29, 2015, 62/233,885 filed on Sep. 28, 2015, 62/293,188 filed on Feb. 9, 2016, and 62/305,123 filed on Mar. 8, 2016, which are all hereby incorporated by reference by their entireties. For example, the devices, apparatus, systems, and methods herein disclosed can be used in (a) the detection, purification and quantification of chemical compounds or biomolecules that correlates with the stage of certain diseases, e.g., infectious and parasitic disease, injuries, cardiovascular disease, cancer, mental disorders, neuropsychiatric disorders and organic diseases, e.g., pulmonary diseases, renal diseases, (b) the detection, purification and quantification of microorganism, e.g., virus, fungus and bacteria from environment, e.g., water, soil, or biological samples, e.g., tissues, bodily fluids, (c) the detection, quantification of chemical compounds or biological samples that pose hazard to food safety or national security, e.g. toxic waste, anthrax, (d) quantification of vital parameters in medical or physiological monitor, e.g., glucose, blood oxygen level, total blood count, (e) the detection and quantification of specific DNA or RNA from biosamples, e.g., cells, viruses, bodily fluids, (f) the sequencing and comparing of genetic sequences in DNA in the chromosomes and mitochondria for genome analysis or (g) to detect reaction products, e.g., during synthesis or purification of pharmaceuticals.

In some embodiments, the analyte can be a biomarker, an environmental marker, or a foodstuff marker. The sample in some instances is a liquid sample, and can be a diagnostic sample (such as saliva, serum, blood, sputum, urine, sweat, lacrima, semen, or mucus); an environmental sample obtained from a river, ocean, lake, rain, snow, sewage, sewage processing runoff, agricultural runoff, industrial runoff, tap water or drinking water; or a foodstuff sample obtained from tap water, drinking water, prepared food, processed food or raw food.

In any embodiment, the sample can be a diagnostic sample obtained from a subject, the analyte can be a biomarker, and the measured the amount of the analyte in the sample can be diagnostic of a disease or a condition.

In any embodiment, the devices, apparatus, systems, and methods in the present invention can further include diagnosing the subject based on information including the measured amount of the biomarker in the sample. In some cases, the diagnosing step includes sending data containing the measured amount of the biomarker to a remote location and receiving a diagnosis based on information including the measurement from the remote location.

In any embodiment, the biomarker can be selected from Tables B1, 2, 3 or 7 as disclosed in U.S. Provisional Application Nos. 62/234,538, 62/293,188, and/or 62/305,123, and/or PCT Application No. PCT/US2016/054,025, which are all incorporated in their entireties for all purposes. In some instances, the biomarker is a protein selected from Tables B1, 2, or 3. In some instances, the biomarker is a nucleic acid selected from Tables B2, 3 or 7. In some instances, the biomarker is an infectious agent-derived biomarker selected from Table B2. In some instances, the biomarker is a microRNA (miRNA) selected from Table B7.

In any embodiment, the applying step b) can include isolating miRNA from the sample to generate an isolated miRNA sample, and applying the isolated miRNA sample to the disk-coupled dots-on-pillar antenna (QMAX device) array.

In any embodiment, the QMAX device can contain a plurality of capture agents that each bind to a biomarker selected from Tables B1, B2, B3 and/or B7, wherein the reading step d) includes obtaining a measure of the amount of the plurality of biomarkers in the sample, and wherein the amount of the plurality of biomarkers in the sample is diagnostic of a disease or condition.

In any embodiment, the capture agent can be an antibody epitope and the biomarker can be an antibody that binds to the antibody epitope. In some embodiments, the antibody epitope includes a biomolecule, or a fragment thereof, selected from Tables B4, B5 or B6. In some embodiments, the antibody epitope includes an allergen, or a fragment thereof, selected from Table B5. In some embodiments, the antibody epitope includes an infectious agent-derived biomolecule, or a fragment thereof, selected from Table B6.

In any embodiment, the QMAX device can contain a plurality of antibody epitopes selected from Tables B4, B5 and/or B6, wherein the reading step d) includes obtaining a measure of the amount of a plurality of epitope-binding antibodies in the sample, and wherein the amount of the plurality of epitope-binding antibodies in the sample is diagnostic of a disease or condition.

In any embodiment, the sample can be an environmental sample, and wherein the analyte can be an environmental marker. In some embodiments, the environmental marker is selected from Table B8 in U.S. Provisional Application No. 62/234,538 and/or PCT Application No. PCT/US2016/054025.

In any embodiment, the method can include receiving or providing a report that indicates the safety or harmfulness for a subject to be exposed to the environment from which the sample was obtained.

In any embodiment, the method can include sending data containing the measured amount of the environmental marker to a remote location and receiving a report that indicates the safety or harmfulness for a subject to be exposed to the environment from which the sample was obtained.

In any embodiment, the QMAX device array can include a plurality of capture agents that each binds to an environmental marker selected from Table B8, and wherein the reading step d) can include obtaining a measure of the amount of the plurality of environmental markers in the sample.

In any embodiment, the sample can be a foodstuff sample, wherein the analyte can be a foodstuff marker, and wherein the amount of the foodstuff marker in the sample can correlate with safety of the foodstuff for consumption. In some embodiments, the foodstuff marker is selected from Table B9.

In any embodiment, the method can include receiving or providing a report that indicates the safety or harmfulness for a subject to consume the foodstuff from which the sample is obtained.

In any embodiment, the method can include sending data containing the measured amount of the foodstuff marker to a remote location and receiving a report that indicates the safety or harmfulness for a subject to consume the foodstuff from which the sample is obtained.

In any embodiment, the devices, apparatus, systems, and methods herein disclosed can include a plurality of capture agents that each binds to a foodstuff marker selected from Table B9 from in U.S. Provisional Application No. 62/234,538 and PCT Application No. PCT/US2016/054025, wherein the obtaining can include obtaining a measure of the amount of the plurality of foodstuff markers in the sample, and wherein the amount of the plurality of foodstuff marker in the sample can correlate with safety of the foodstuff for consumption.

Also provided herein are kits that find use in practicing the devices, systems and methods in the present invention.

The amount of sample can be about a drop of a sample. The amount of sample can be the amount collected from a pricked finger or fingerstick. The amount of sample can be the amount collected from a microneedle or a venous draw.

A sample can be used without further processing after obtaining it from the source, or can be processed, e.g., to enrich for an analyte of interest, remove large particulate matter, dissolve or resuspend a solid sample, etc.

Any suitable method of applying a sample to the QMAX device can be employed. Suitable methods can include using a pipette, dropper, syringe, etc. In certain embodiments, when the QMAX device is located on a support in a dipstick format, as described below, the sample can be applied to the QMAX device by dipping a sample-receiving area of the dipstick into the sample.

A sample can be collected at one time, or at a plurality of times. Samples collected over time can be aggregated and/or processed (by applying to a QMAX device and obtaining a measurement of the amount of analyte in the sample, as described herein) individually. In some instances, measurements obtained over time can be aggregated and can be useful for longitudinal analysis over time to facilitate screening, diagnosis, treatment, and/or disease prevention.

Washing the QMAX device to remove unbound sample components can be done in any convenient manner, as described above. In certain embodiments, the surface of the QMAX device is washed using binding buffer to remove unbound sample components.

Detectable labeling of the analyte can be done by any convenient method. The analyte can be labeled directly or indirectly. In direct labeling, the analyte in the sample is labeled before the sample is applied to the QMAX device. In indirect labeling, an unlabeled analyte in a sample is labeled after the sample is applied to the QMAX device to capture the unlabeled analyte, as described below.

4. Labels

The devices, apparatus, systems, and methods herein disclosed can be used with various types of labels, which include the labels disclosed, described and/or summarized in PCT Application (designating U.S.) No. PCT/US2016/045437, which was filed on Aug. 10, 2016, and is hereby incorporated by reference by its entirety.

In some embodiments, the label is optically detectable, such as but not limited to a fluorescence label. In some embodiments, the labels include, but are not limited to, IRDye800CW, Alexa 790, Dylight 800, fluorescein, fluorescein isothiocyanate, succinimidyl esters of carboxyfluorescein, succinimidyl esters of fluorescein, 5-isomer of fluorescein dichlorotriazine, caged carboxyfluorescein-alanine-carboxamide, Oregon Green 488, Oregon Green 514; Lucifer Yellow, acridine Orange, rhodamine, tetramethylrhodamine, Texas Red, propidium iodide, JC-1 (5,5',6,6'-tetrachloro-1,1',3,3'-tetraethylbenzimidazoylcarbocyanine iodide), tetrabromorhodamine 123, rhodamine 6G, TMRM (tetramethyl rhodamine methyl ester), TMRE (tetramethyl rhodamine ethyl ester), tetramethylrosamine, rhodamine B and 4-dimethylaminotetramethylrosamine, green fluorescent protein, blue-shifted green fluorescent protein, cyan-shifted green fluorescent protein, red-shifted green fluorescent protein, yellow-shifted green fluorescent protein, 4-acetamido-4'-isothiocyanatostilbene-2,2'disulfonic acid; acridine and derivatives, such as acridine, acridine isothiocyanate; 5-(2'-aminoethyl)aminonaphthalene-1-sulfonic acid (EDANS); 4-amino-N-[3-vinylsulfonyl)phenyl]naphthalimide-3,5 disulfonate; N-(4-anilino-1-naphthyl)maleimide; anthranilamide; 4,4-difluoro-5-(2-thienyl)-4-bora-3a,4a diaza-5-indacene-3-propioni-c acid BODIPY; cascade blue; Brilliant Yellow; coumarin and derivatives: coumarin, 7-amino-4-methylcoumarin (AMC, Coumarin 120),7-amino-4-trifluoromethylcoumarin (Coumarin 151); cyanine dyes; cyanosine; 4',6-diaminidino-2-phenylindole (DAPI); 5',5"-dibromopyrogallol-sulfonaphthalein (Bromopyrogallol Red); 7-diethylamino-3-(4'-isothiocyanatophenyl)-4-methylcoumarin; diethylenetriaamine pentaacetate; 4,4'-diisothiocyanatodihydro-stilbene-2-,2'-disulfonic acid; 4,4'-diisothiocyanatostilbene-2,2'-disulfonic acid; 5-(dimethylamino]naphthalene-1-sulfonyl chloride (DNS, dansylchloride); 4-dimethylaminophenylazophenyl-4'-isothiocyanate (DABITC); eosin and derivatives: eosin, eosin isothiocyanate, erythrosin and derivatives: erythrosin B, erythrosin, isothiocyanate; ethidium; fluorescein and derivatives: 5-carboxyfluorescein (FAM),5-(4,6-dichlorotriazin-2-yl)amino-fluorescein (DTAF), 2',7'dimethoxy-4'5'-dichloro-6-carboxyfluorescein (JOE), fluorescein, fluorescein isothiocyanate, QFITC, (XRITC); fluorescamine; 1R144; 1R1446; Malachite Green isothiocyanate; 4-methylumbelliferoneortho cresolphthalein; nitrotyrosine; pararosaniline; Phenol Red; B-phycoerythrin; o-phthaldialdehyde; pyrene and derivatives: pyrene, pyrene butyrate, succinimidyl 1-pyrene; butyrate quantum dots; Reactive Red 4 (Cibacron™ Brilliant Red 3B-A) rhodamine and derivatives: 6-carboxy-X-rhodamine (ROX), 6-carboxyrhodamine (R6G), lissamine rhodamine B sulfonyl chloride rhodamine (Rhod), rhodamine B, rhodamine 123, rhodamine X isothiocyanate, sulforhodamine B, sulforhodamine 101, sulfonyl chloride derivative of sulforhodamine 101 (Texas Red); N,N,N',N'-tetramethyl-6-carboxyrhodamine (TAM RA); tetramethyl rhodamine; tetramethyl hodamine isothiocyanate (TRITC); riboflavin; 5-(2'-aminoethyl) aminonaphtha-lene-1-sulfonic acid (EDANS), 4-(4'-dimethylaminophe-nylazo)benzoic acid (DABCYL), rosolic acid; CAL Fluor Orange 560; terbium chelate derivatives; Cy 3; Cy 5; Cy 5.5; Cy 7; IRD 700; IRD 800; La Jolla Blue; phthalo cyanine; and naphthalo cyanine, coumarins and related dyes, xanthene dyes such as rhodols, resorufins, bimanes, acridines, isoindoles, dansyl dyes, aminophthalic hydrazides such as luminol, and isoluminol derivatives, aminophthalimides, aminonaphthalimides, aminobenzofurans, aminoquinolines, dicyanohydroquinones, fluorescent europium and terbium complexes; combinations thereof, and the like. Suitable fluorescent proteins and chromogenic proteins include, but are not limited to, a green fluorescent protein (GFP), including, but not limited to, a GFP derived from Aequoria victoria or a derivative thereof, e.g., a "humanized" derivative such as Enhanced GFP; a GFP from another species such as *Renilla reniformis, Renilla mulleri*, or *Ptilosarcus guernyi*; "humanized" recombinant GFP (hrGFP); any of a variety of fluorescent and colored proteins from Anthozoan species; combinations thereof; and the like.

5. QMAX Device

The devices, apparatus, systems, and methods herein disclosed can include or use a QMAX device ((Q: quantification; M: magnifying; A: adding reagents; X: acceleration; also known as Q-card in some embodiments or compressed regulated open flow (CROF) device), which include the QMAX device listed, described and/or summarized in PCT Application (designating U.S.) Nos. PCT/US2016/045437 filed on Aug. 10, 2016, and U.S Provisional Application Nos. 62,431,639 filed on Dec. 9, 2016 and 62/456,287 filed on Feb. 8, 2017, which are all hereby incorporated by reference by their entireties.

As used here, the terms "CROF Card (or card)", "COF Card", "QMAX-Card", "Q-Card", "CROF device", "COF device", "QMAX-device", "CROF plates", "COF plates", and "QMAX-plates" are interchangeable, except that in some embodiments, the COF card does not comprise spacers; and the terms refer to a device that comprises a first plate and a second plate that are movable relative to each other into different configurations (including an open configuration and a closed configuration), and that comprises spacers (except some embodiments of the COF) that regulate the spacing between the plates. The term "X-plate" refers to one of the two plates in a CROF card, wherein the spacers are fixed to this plate. More descriptions of the COF Card, CROF Card, and X-plate are described in the provisional application Ser. No. 62/456,065, filed on Feb. 7, 2017, which is incorporated herein in its entirety for all purposes.

The term "compressed open flow (COF)" refers to a method that changes the shape of a flowable sample deposited on a plate by (i) placing other plate on top of at least a part of the sample and (ii) then compressing the sample between the two plates by pushing the two plates towards each other; wherein the compression reduces a thickness of at least a part of the sample and makes the sample flow into open spaces between the plates. The term "compressed regulated open flow" or "CROF" (or "self-calibrated compressed open flow" or "SCOF" or "SCCOF") (also known as QMAX) refers to a particular type of COF, wherein the final thickness of a part or entire sample after the compression is "regulated" by spacers, wherein the spacers are placed between the two plates. Here the CROF device is used interchangeably with the QMAX card.

The term "open configuration" of the two plates in a QMAX process means a configuration in which the two plates are either partially or completely separated apart and the spacing between the plates is not regulated by the spacers The term "closed configuration" of the two plates in a QMAX process means a configuration in which the plates are facing each other, the spacers and a relevant volume of the sample are between the plates, the relevant spacing between the plates, and thus the thickness of the relevant volume of the sample, is regulated by the plates and the spacers, wherein the relevant volume is at least a portion of an entire volume of the sample.

The term "a sample thickness is regulated by the plate and the spacers" in a QMAX process means that for a give condition of the plates, the sample, the spacer, and the plate compressing method, the thickness of at least a port of the sample at the closed configuration of the plates can be predetermined from the properties of the spacers and the plate.

The term "inner surface" or "sample surface" of a plate in a QMAX card refers to the surface of the plate that touches the sample, while the other surface (that does not touch the sample) of the plate is termed "outer surface".

The term "height" or "thickness" of an object in a QMAX process refers to, unless specifically stated, the dimension of the object that is in the direction normal to a surface of the plate. For example, spacer height is the dimension of the spacer in the direction normal to a surface of the plate, and the spacer height and the spacer thickness means the same thing.

The term "area" of an object in a QMAX process refers to, unless specifically stated, the area of the object that is parallel to a surface of the plate. For example, spacer area is the area of the spacer that is parallel to a surface of the plate.

The term of QMAX card refers the device that perform a QMAX (e.g. CROF) process on a sample, and have or not have a hinge that connect the two plates.

The term "QMAX card with a hinge and "QMAX card" are interchangeable.

The term "angle self-maintain", "angle self-maintaining", or "rotation angle self-maintaining" refers to the property of the hinge, which substantially maintains an angle between the two plates, after an external force that moves the plates from an initial angle into the angle is removed from the plates.

In using QMAX card, the two plates need to be open first for sample deposition. However, in some embodiments, the QMAX card from a package has the two plates are in contact each other (e.g. a close position), and to separate them is challenges, since one or both plates are very thing. To facilitate an opening of the QMAX card, opening notch or notches are created at the edges or corners of the first plate or both places, and, at the close position of the plates, a part of the second plate placed over the opening notch, hence in the notch of the first plate, the second plate can be lifted open without a blocking of the first plate.

In the QMAX assay platform, a QMAX card uses two plates to manipulate the shape of a sample into a thin layer (e.g. by compressing). In certain embodiments, the plate manipulation needs to change the relative position (termed: plate configuration) of the two plates several times by human hands or other external forces. There is a need to design the QMAX card to make the hand operation easy and fast.

In QMAX assays, one of the plate configurations is an open configuration, wherein the two plates are completely or partially separated (the spacing between the plates is not controlled by spacers) and a sample can be deposited. Another configuration is a closed configuration, wherein at least part of the sample deposited in the open configuration is compressed by the two plates into a layer of highly uniform thickness, the uniform thickness of the layer is confined by the inner surfaces of the plates and is regulated by the plates and the spacers. In some embodiments, the average spacing between the two plates is more than 300 um.

In a QMAX assay operation, an operator needs to first make the two plates to be in an open configuration ready for sample deposition, then deposit a sample on one or both of the plates, and finally close the plates into a close position. In certain embodiments, the two plates of a QMAX card are initially on top of each other and need to be separated to get into an open configuration for sample deposition. When one of the plate is a thin plastic film (175 um thick PMA), such separation can be difficult to perform by hand. The present invention intends to provide the devices and methods that make the operation of certain assays, such as the QMAX card assay, easy and fast.

In some embodiments, the QMAX device comprises a hinge that connect two or more plates together, so that the plates can open and close in a similar fashion as a book. In some embodiments, the material of the hinge is such that the hinge can self-maintain the angle between the plates after adjustment. In some embodiments, the hinge is configured to maintain the QMAX card in the closed configuration, such that the entire QMAX card can be slide in and slide out a card slot without causing accidental separation of the two plates. In some embodiments, the QMAX device comprises one or more hinges that can control the rotation of more than two plates.

In some embodiments, the hinge is made from a metallic material that is selected from a group consisting of gold, silver, copper, aluminum, iron, tin, platinum, nickel, cobalt, alloys, or any combination of thereof. In some embodiments, the hinge comprises a single layer, which is made from a polymer material, such as but not limited to plastics. The polymer material is selected from the group consisting of acrylate polymers, vinyl polymers, olefin polymers, cellulosic polymers, noncellulosic polymers, polyester polymers, Nylon, cyclic olefin copolymer (COC), poly(methyl methacrylate) (PMMB), polycarbonate (PC), cyclic olefin polymer (COP), liquid crystalline polymer (LCP), polyimide (PB), polyethylene (PE), polyimide (PI), polypropylene (PP), poly(phenylene ether) (PPE), polystyrene (PS), polyoxymethylene (POM), polyether ether ketone (PEEK), polyether sulfone (PES), poly(ethylene phthalate) (PET), polytetrafluoroethylene (PTFE), polyvinyl chloride (PVC), polyvinylidene fluoride (PVDF), polybutylene terephthalate (PBT), fluorinated ethylene propylene (FEP), perfluoroalkoxyalkane (PFB), polydimethylsiloxane (PDMS), rubbers, or any combinations of thereof. In some embodiments, the polymer material is selected from polystyrene, PMMB, PC, COC, COP, other plastic, or any combination of thereof.

In some embodiments, the QMAX device comprises opening mechanisms such as but not limited to notches on plate edges or strips attached to the plates, making is easier for a user to manipulate the positioning of the plates, such as but not limited to separating the plates of by hand.

In some embodiments, the QMAX device comprises trenches on one or both of the plates. In certain embodiments, the trenches limit the flow of the sample on the plate.

6. Spacers

The devices, apparatus, systems, and methods herein disclosed can include or use a device (e.g. a QMAX device), which comprises spacers that are listed, described and/or summarized in PCT Application (designating U.S.) No. PCT/US2016/045437 filed on Aug. 10, 2016, and U.S Provisional Application Nos. 62/431,639 filed on Dec. 9, 2016 and 62/456,287 filed on Feb. 8, 2017, which are all hereby incorporated by reference by their entireties.

In essence, the term "spacers" or "stoppers" refers to, unless stated otherwise, the mechanical objects that set, when being placed between two plates, a limit on the minimum spacing between the two plates that can be reached when compressing the two plates together. Namely, in the compressing, the spacers will stop the relative movement of the two plates to prevent the plate spacing becoming less than a preset (i.e. predetermined) value.

The term "a spacer has a predetermined height" and "spacers have a predetermined inter-spacer distance" means, respectively, that the value of the spacer height and the inter spacer distance is known prior to a QMAX process. It is not predetermined, if the value of the spacer height and the inter-spacer distance is not known prior to a QMAX process. For example, in the case that beads are sprayed on a plate as spacers, where beads are landed at random locations of the plate, the inter-spacer distance is not predetermined. Another example of not predetermined inter spacer distance is that the spacers moves during a QMAX processes.

The term "a spacer is fixed on its respective plate" in a QMAX process means that the spacer is attached to a location of a plate and the attachment to that location is maintained during a QMAX (i.e. the location of the spacer on respective plate does not change) process. An example of "a spacer is fixed with its respective plate" is that a spacer is monolithically made of one piece of material of the plate, and the location of the spacer relative to the plate surface does not change during the QMAX process. An example of "a spacer is not fixed with its respective plate" is that a spacer is glued to a plate by an adhesive, but during a use of the plate, during the QMAX process, the adhesive cannot hold the spacer at its original location on the plate surface and the spacer moves away from its original location on the plate surface.

7. Adaptor

The devices, apparatus, systems, and methods herein disclosed can be used with an adaptor, which is configured to accommodate the device and connect the device to a reader, such as but not limited to a smartphone. In some embodiments, the Q-cards are used together with sliders that allow the card to be inserted into the adaptor so that the card can be read by a smartphone detection system. The structure, material, function, variation, dimension and connection of the Q-card, the sliders, and the adaptor are disclosed, listed, described, and/or summarized in PCT Application (designating U.S.) Nos. PCT/US2016/045437 filed on Aug. 10, 2016 and PCT/US0216/051775 filed on Sep. 14, 2016, US Provisional Application Nos. 62/456,590 filed on Feb. 8, 2017, 62/459,554 filed on Feb. 15, 2017, and 62/460,075 filed on Feb. 8, 2017, all of which applications are incorporated herein in their entireties for all purposes.

In some embodiments, the adaptor comprises a receptacle slot, which is configured to accommodate the QMAX device when the device is in a closed configuration. In certain embodiments, the QMAX device has a sample deposited therein and the adaptor can be connected to a mobile device (e.g. a smartphone) so that the sample can be read by the mobile device. In certain embodiments, the mobile device can detect and/or analyze a signal from the sample. In certain embodiments, the mobile device can capture images of the sample when the sample is in the QMAX device and positioned in the field of view (FOV) of a camera, which in certain embodiments, is part of the mobile device.

In some embodiments, the adaptor comprises optical components, which are configured to enhance, magnify, and/or optimize the production of the signal from the sample. In some embodiments, the optical components include parts that are configured to enhance, magnify, and/or optimize illumination provided to the sample. In certain embodiments, the illumination is provided by a light source that is part of the mobile device. In some embodiments, the optical components include parts that are configured to enhance, magnify, and/or optimize a signal from the sample. The structures, functions, and configurations of the optical components in some embodiments can be found in PCT Application (designating U.S.) Nos. PCT/US2016/045437 filed on Aug. 10, 2016 and PCT/US0216/051775 filed on Sep. 14, 2016, US Provisional Application Nos. 62/456,590 filed on Feb. 8, 2017, 62/459,554 filed on Feb. 15, 2017, and 62/460,075 filed on Feb. 8, 2017, all of which applications are incorporated herein in their entireties for all purposes.

8. Dimensions

The devices, apparatus, systems, and methods herein disclosed can include or use a QMAX device, which can comprise plates and spacers. In some embodiments, the dimension of the individual components of the QMAX device and its adaptor are listed, described and/or summarized in PCT Application (designating U.S.) No. PCT/US2016/045437 filed on Aug. 10, 2016, and U.S Provisional Application Nos. 62/431,639 filed on Dec. 9, 2016 and 62/456,287 filed on Feb. 8, 2017, which are all hereby incorporated by reference by their entireties.

In some embodiments, the dimensions are listed in the Tables below:

Plates:

| Parameters | Embodiments | Preferred Embodiments |
|---|---|---|
| Shape | round, ellipse, rectangle, triangle, polygonal, ring-shaped, or any superposition of these shapes; the two (or more) plates of the QMAX card can have the same size and/or shape, or different size and/or shape; | at least one of the two (or more) plates of the QMAX card has round corners for user safety concerns, wherein the round corners have a diameter of 100 um or less, 200 um or less, 500 um or less, 1 mm or less, 2 mm or less, 5 mm or less, 10 mm or less, 50 mm or less, or in a range between any two of the values. |
| Thickness | the average thickness for at least one of the plates is 2 nm or less, 10 nm or less, 100 nm or less, 200 nm or less, 500 nm or less, 1000 nm or less, 2 μm (micron) or less, 5 μm or less, 10 μm or less, 20 μm or less, 50 μm or less, 100 μm or less, 150 μm or less, 200 μm or less, 300 μm or less, 500 μm or less, 800 μm or less, 1 mm (millimeter) or less, 2 mm or less, 3 mm or less, 5 mm or less, 10 mm or less, 20 mm or less, 50 mm or less, 100 mm or less, 500 mm or less, or in a range between any two of these values | For at least one of the plates is in the range of 0.5 to 1.5 mm; around 1 mm; in the range of 0.15 to 0.2 mm; or around 0.175 mm |
| Lateral Area | For at least one of the plate is 1 mm2 (square millimeter) or less, 10 mm2 or less, 25 mm2 or less, 50 mm2 or less, 75 mm2 or less, 1 cm2 (square centimeter) or less, 2 cm2 or less, 3 cm2 or less, 4 cm2 or less, 5 cm2 or less, 10 cm2 or less, 100 cm2 or less, 500 cm2 or less, 1000 cm2 or less, 5000 cm2 or less, 10,000 cm2 or less, 10,000 cm2 or less, or in a range between any two of these values | For at least one plate of the QMAX card is in the range of 500 to 1000 mm$^2$; or around 750 mm$^2$. |
| Lateral Linear Dimension (width, length, or diameter, etc.) | For at least one of the plates of the QMAX card is 1 mm or less, 5 mm or less, 10 mm or less, 15 mm or less, 20 mm or less, 25 mm or less, 30 mm or less, 35 mm or less, 40 mm or less, 45 mm or less, 50 mm or less, 100 mm or less, 200 mm or less, 500 mm or less, 1000 mm or less, 5000 mm or less, or in a range between any two of these values | For at least one plate of the QMAX card is in the range of 20 to 30 mm; or around 24 mm |
| Recess width | 1 um or less, 10 um or less, 20 um or less, 30 um or less, 40 um or less, 50 um or less, 100 um or less, 200 um or less, 300 um or less, 400 um or less, 500 um or less, 7500 um or less, 1 mm or less, 5 mm or less, 10 mm or less, 100 mm or less, or 1000 mm or less, or in a range between any two of these values. | In the range of 1 mm to 10 mm; Or About 5 mm |

Hinge:

| Parameters | Embodiments | Preferred Embodiments |
|---|---|---|
| Number | 1, 2, 3, 4, 5, or more | 1 or 2 |
| Length of Hinge Joint | 1 mm or less, 2 mm or less, 3 mm or less, 4 mm or less, 5 mm or less, 10 mm or less, 15 mm or less, 20 mm or less, 25 mm or less, 30 mm or less, 40 mm or less, 50 mm or less, 100 mm or less, 200 mm or less, or 500 mm or less, or in a range between any two of these values | In the range of 5 mm to 30 mm. |
| Ratio (hinge joint length vs. aligning plate edge length | 1.5 or less, 1 or less, 0.9 or less, 0.8 or less, 0.7 or less, 0.6 or less, 0.5 or less, 0.4 or less, 0.3 or less, 0.2 or less, 0.1 or less, 0.05 or less or in a range between any two of these values. | In the range of 0.2 to 1; or about 1 |

-continued

| Parameters | Embodiments | Preferred Embodiments |
| --- | --- | --- |
| Area | 1 mm$^2$ or less, 5 mm$^2$ or less, 10 mm$^2$ or less, 20 mm$^2$ or less, 30 mm$^2$ or less, 40 mm$^2$ or less, 50 mm$^2$ or less, 100 mm$^2$ or less, 200 mm$^2$ or less, 500 mm$^2$ or less, or in a range between any of the two values | In the range of 20 to 200 mm$^2$; or about 120 mm$^2$ |
| Ratio (hinge area vs. plate area) | 1 or less, 0.9 or less, 0.8 or less, 0.7 or less, 0.6 or less, 0.5 or less, 0.4 or less, 0.3 or less, 0.2 or less, 0.1 or less, 0.05 or less, 0.01 or less or in a range between any two of these values | In the range of 0.05 to 0.2, around 0.15 |
| Max. Open Degree | 15 or less, 30 or less, 45 or less, 60 or less, 75 or less, 90 or less, 105 or less, 120 or less, 135 or less, 150 or less, 165 or less, 180 or less, 195 or less, 210 or less, 225 or less, 240 or less, 255 or less, 270 or less, 285 or less, 300 or less, 315 or less, 330 or less, 345 or less or 360 or less degrees, or in a range between any two of these values | In the range of 90 to 180 degrees |
| No. of Layers | 1, 2, 3, 4, 5, or more | 1 or 2 |
| Layer thickness | 0.1 um or less, 1 um or less, 2 um or less, 3 um or less, 5 um or less, 10 um or less, 20 um or less, 30 um or less, 50 um or less, 100 um or less, 200 um or less, 300 um or less, 500 um or less, 1 mm or less, 2 mm or less, and a range between any two of these values | In the range of 20 um to 1 mm; or Around 50 um |
| Angle-maintaining | Limiting the angle adjustment with no more than ±90, ±45, ±30, ±25, ±20, ±15, ±10, ±8, ±6, ±5, ±4, ±3, ±2, or ±1, or in a range between any two of these values | No more than ±2 |

Notch:

Receptacle Slot 25

| Parameters | Embodiments | Preferred Embodiments |
| --- | --- | --- |
| Number | 1, 2, 3, 4, 5, or more | 1 or 2 |
| Shape | round, ellipse, rectangle, triangle, polygon, ring-shaped, or any superposition or portion of these shapes. | Part of a circle |
| Positioning | Any location along any edge except the hinge edge, or any corner joint by non-hinge edges | |
| Lateral Linear Dimension (Length along the edge, radius, etc.) | 1 mm or less, 2.5 mm or less, 5 mm or less, 10 mm or less, 15 mm or less, 20 mm or less, 25 mm or less, 30 mm or less, 40 mm or less, 50 mm or less, or in a range between any two of these values | In the range of 5 mm to 15 mm; or about 10 mm |
| Area | 1 mm$^2$ (square millimeter) or less, 10 mm$^2$ or less, 25 mm$^2$ or less, 50 mm$^2$ or less, 75 mm$^2$ or less or in a range between any two of these values. | In the range of 10 to 150 mm$^2$; or about 50 mm$^2$ |

Trench:

| Parameters | Embodiments | Preferred Embodiments |
| --- | --- | --- |
| Number | 1, 2, 3, 4, 5, or more | 1 or 2 |
| Shape | Closed (round, ellipse, rectangle, triangle, polygon, ring-shaped, or any superposition or portion of these shapes) or open-ended (straight line, curved line, arc, branched tree, or any other shape with open endings); | |
| Length | 0.001 mm or less, 0.005 mm or less, 0.01 mm or less, 0.05 mm or less, 0.1 mm or less, 0.5 mm or less, 1 mm or less, 2 mm or less, 5 mm or less, 10 mm or less, 20 mm or less, 50 mm or less, 100 mm or less, or in a range between any two of these values | |
| Cross-sectional Area | 0.001 mm$^2$ or less, 0.005 mm$^2$ or less, 0.01 mm$^2$ or less, 0.05 mm$^2$ or less, 0.1 mm$^2$ or less, 0.5 mm$^2$ or less, 1 mm$^2$ or less, 2 mm$^2$ or less, 5 mm$^2$ or less, 10 mm$^2$ or less, 20 mm$^2$ or less, or in a range between any two of these values. | |
| Volume | 0.1 uL or more, 0.5 uL or more, 1 uL or more, 2 uL or more, 5 uL or more, 10 uL or more, 30 uL or more, 50 uL or more, 100 uL or more, 500 uL or more, 1 mL or more, or in a range between any two of these values | In the range of 1 uL to 20 uL; or About 5 uL |

| Parameters | Embodiments | Preferred Embodiments |
|---|---|---|
| Shape of receiving area | round, ellipse, rectangle, triangle, polygon, ring-shaped, or any superposition of these shapes; | |
| Difference between sliding track gap size and card thickness | 100 nm, 500 nm, 1 um, 2 um, 5 um, 10 um, 50 um, 100 um, 300 um, 500 um, 1 mm, 2 mm, 5 mm, 1 cm, or in a range between any two of the values. | In the range of 50 to 300 um; or about 75 um |
| Difference between receiving area and card area | 1 mm² (square millimeter) or less, 10 mm² or less, 25 mm² or less, 50 mm² or less, 75 mm² or less, 1 cm² (square centimeter) or less, 2 cm² or less, 3 cm² or less, 4 cm² or less, 5 cm² or less, 10 cm² or less, 100 cm² or less, or in a range between any of the two values. | |

9. Hand Pressing

For the devices, apparatus, systems, and methods herein disclosed, human hands can be used for manipulating or handling or the plates and/or samples. In some embodiments, human hands can be used to press the plates into a closed configuration; In some embodiments, human hands can be used to press the sample into a thin layer. The manners in which hand pressing is employed are described and/or summarized in PCT Application (designating U.S.) Nos. PCT/US2016/045437 filed on Aug. 10, 2016 and PCT/US0216/051775 filed on Sep. 14, 2016, and in US Provisional Application Nos. 62/431,639 filed on Dec. 9, 2016, 62/456,287 filed on Feb. 8, 2017, 62/456,065 filed on Feb. 7, 2017, 62/456,504 filed on Feb. 8, 2017, and 62/460,062 filed on Feb. 16, 2017, which are all hereby incorporated by reference by their entireties.

In some embodiments, human hand can be used to manipulate or handle the plates of the QMAX device. In certain embodiments, the human hand can be used to apply an imprecise force to compress the plates from an open configuration to a closed configuration. In certain embodiments, the human hand can be used to apply an imprecise force to achieve high level of uniformity in the thickness of the sample (e.g. less than 5%, 10%, 15%, or 20% variability).

10. Smartphone

The devices, apparatus, systems, and methods herein disclosed can be used with a mobile device, such as but not limited to a smartphone. The smartphone detection technology is herein disclosed, or listed, described, and/or summarized in PCT Application (designating U.S.) Nos. PCT/US2016/045437 and PCT/US0216/051775, which were respectively filed on Aug. 10, 2016 and Sep. 14, 2016, U.S. Provisional Application No. 62/456,065, which was filed on Feb. 7, 2017, U.S. Provisional Application No. 62/456,287, which was filed on Feb. 8, 2017, and U.S. Provisional Application No. 62/456,504, which was filed on Feb. 8, 2017, all of which applications are incorporated herein in their entireties for all purposes.

In some embodiments, the smartphone comprises a camera, which can be used to capture images or the sample when the sample is positioned in the field of view of the camera (e.g. by an adaptor). In certain embodiments, the camera includes one set of lenses (e.g. as in iPhone™ 6). In certain embodiments, the camera includes at least two sets of lenses (e.g. as in iPhone™ 7). In some embodiments, the smartphone comprises a camera, but the camera is not used for image capturing.

In some embodiments, the smartphone comprises a light source such as but not limited to LED (light emitting diode). In certain embodiments, the light source is used to provide illumination to the sample when the sample is positioned in the field of view of the camera (e.g. by an adaptor). In some embodiments, the light from the light source is enhanced, magnified, altered, and/or optimized by optical components of the adaptor.

In some embodiments, the smartphone comprises a processor that is configured to process the information from the sample. The smartphone includes software instructions that, when executed by the processor, can enhance, magnify, and/or optimize the signals (e.g. images) from the sample. The processor can include one or more hardware components, such as a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

In some embodiments, the smartphone comprises a communication unit, which is configured and/or used to transmit data and/or images related to the sample to another device. Merely by way of example, the communication unit can use a cable network, a wireline network, an optical fiber network, a telecommunications network, an intranet, the Internet, a local area network (LAN), a wide area network (WAN), a wireless local area network (WLAN), a metropolitan area network (MAN), a wide area network (WAN), a public telephone switched network (PSTN), a Bluetooth network, a Zig Bee network, a near field communication (NFC) network, or the like, or any combination thereof.

In some embodiments, the smartphone is an iPhone™, an Android™ phone, or a Wndows™ phone.

11. Cloud

The devices, apparatus, systems, and methods herein disclosed can be used with cloud storage and computing technologies. The related cloud technologies are herein disclosed, or listed, described, and summarized in PCT Application (designating U.S.) Nos. PCT/US2016/045437 and PCT/US0216/051775, which were respectively filed on Aug. 10, 2016 and Sep. 14, 2016, U.S. Provisional Application No. 62/456,065, which was filed on Feb. 7, 2017, U.S. Provisional Application No. 62/456,287, which was filed on Feb. 8, 2017, and U.S. Provisional Application No. 62/456, 504, which was filed on Feb. 8, 2017, all of which applications are incorporated herein in their entireties for all purposes.

In some embodiments, the cloud storage and computing technologies can involve a cloud database. Merely by way of example, the cloud platform can include a private cloud, a public cloud, a hybrid cloud, a community cloud, a distributed cloud, an inter-cloud, a multi-cloud, or the like, or any combination thereof. In some embodiments, the mobile device (e.g. smartphone) can be connected to the cloud through any type of network, including a local area network (LAN) or a wide area network (WAN).

In some embodiments, the data (e.g. images of the sample) related to the sample is sent to the cloud without processing by the mobile device and further analysis can be conducted remotely. In some embodiments, the data related to the sample is processed by the mobile device and the results are sent to the cloud. In some embodiments, both the raw data and the results are transmitted to the cloud.

What is claimed is:

1. A method of dilution calibration and sample analysis, comprising:
    providing an initial sample containing a calibration marker and suspected of containing an analyte, wherein the calibration marker has a first concentration with a known preset value;
    diluting the initial sample with an unknown volume of a diluent to form a diluted sample;
    using an assay device to obtain a second concentration of the calibration marker and analyzing the analyte in the diluted sample; and
    determining a dilution factor for the diluted sample by comparing the first concentration and the second concentration, and calibrating the analysis of the analyte based on the dilution factor.

2. The method of claim 1, wherein the preset value is an estimated normal value, which is different from a true value of the first concentration by less than 30%.

3. The method of claim 1, further comprising obtaining the first concentration of the calibration marker in the initial sample.

4. The method of claim 3, wherein the obtaining is performed using a first set of the assay device, and the step (iv) of obtaining and analyzing is performed using a second set of the assay device, and wherein the two sets of the assay device are of the same type.

5. The method of claim 1, wherein the assay device comprises a QMAX device that comprises:
    a first plate, a second plate, and spacers, wherein:
        i. the plates are movable relative to each other into different configurations;
        ii. each of the plates has, on its respective surface, a sample contact area for contacting a sample suspected of containing an analyte; and
        iii. one or both of the plates comprise spacers that are fixed with a respective plate, wherein the spacers have a predetermined substantially uniform height and a predetermined constant inter-spacer distance and wherein at least one of the spacers is inside the sample contact area;
    wherein one of the configurations is an open configuration, in which: the two plates are separated apart, the spacing between the plates is not regulated by the spacers, and the sample is deposited on one or both of the plates; and
    wherein another of the configurations is a closed configuration which is configured after the sample deposition in the open configuration; and in the closed configuration: at least part of the sample is compressed by the two plates into a layer of uniform thickness, wherein the uniform thickness of the layer is confined by the inner surfaces of the two plates and is regulated by the plates and the spacers, and has an average thickness.

6. The method of claim 5, wherein for a flexible plate, the thickness of the flexible plate times the Young's modulus of the flexible plate is in the range 60 to 750 GPa-um.

7. The method of claim 5, wherein for a flexible plate, the fourth power of the inter-spacer-distance (ISD) divided by the thickness of the flexible plate (h) and the Young's modulus (E) of the flexible plate, ISD4/(hE), is equal to or less than 106 um3/GPa.

8. The method of claim 5, wherein one or both plates comprises a location marker, either on a surface of or inside the plate, that provide information of a location of the plate.

9. The method of claim 5, wherein one or both plates comprises a scale marker, either on a surface of or inside the plate, that provide information of a lateral dimension of a structure of the sample and/or the plate.

10. The method of claim 5, wherein one or both plates comprises an imaging marker, either on surface of or inside the plate, that assists an imaging of the sample.

11. The method of claim 5, wherein the average thickness of the layer of uniform thickness is in the range of 2 µm to 2.2 µm, 2.2 µm to 2.6 µm, 1.8 µm to 2 µm, or 2.6 µm to 3.8 µm, and the sample is blood.

12. The method of claim 5, wherein the average thickness of the layer of uniform thickness is about equal to a minimum dimension of an analyte in the sample.

13. The method of claim 5, wherein the inter-spacer distance is in the range of 7 µm to 50 µm, 50 µm to 120 µm, or 120 µm to 200 µm.

14. The method of claim 5, wherein the inter-spacer distance is substantially periodic.

15. The method of claim 5, wherein the spacers are pillars with a cross-sectional shape selected from the group consisting of: round, polygonal, circular, square, rectangular, oval, elliptical, or any combination of the same.

16. The method of claim 5, wherein each spacer has the ratio of the lateral dimension of the spacer to its height is at least 1.

17. The method of claim 5, wherein the minimum lateral dimension of spacer is in the range of 0.5 µm to 100 µm, or 0.5 µm to 10 µm.

18. The method of claim 5, wherein the pressing of the QMAX device is by a human hand.

19. The method of claim 5, wherein the spacers of the QMAX device have a pillar shape, a substantially flat top surface, a predetermined substantially uniform height, and a predetermined constant inter-spacer distance that is at least about 2 times larger than the size of the analyte, wherein the Young's modulus of the spacers times the filling factor of the spacers is equal or larger than 2 MPa, wherein the filling factor is the ratio of the spacer contact area to the total plate area, and wherein, for each spacer, the ratio of the lateral dimension of the spacer to its height is at least 1 (one).

20. The method of claim 5, wherein the spacers of the QMAX device have a pillar shape, a substantially flat top surface, a predetermined substantially uniform height, and a predetermined constant inter-spacer distance that is at least about 2 times larger than the size of the analyte, wherein the Young's modulus of the spacers times the filling factor of the spacers is equal or larger than 2 MPa, wherein the filling factor is the ratio of the spacer contact area to the total plate area, and wherein, for each spacer, the ratio of the lateral dimension of the spacer to its height is at least 1 (one), wherein the fourth power of the inter-spacer-distance (ISD) divided by the thickness (h) and the Young's modulus (E) of the flexible plate (ISD^4/(hE)) is 5×10^6 um^3/GPa or less.

21. The method of claim 5, wherein the ratio of the inter-spacer distance of the spacers of the QMAX device to the average width of the spacers is 2 or larger, and the filling factor of the spacers multiplied by the Young's modulus of the spacers is 2 MPa or larger.

22. The method of claim 5, wherein the analytes are the analyte in the detection of proteins, peptides, nucleic acids, synthetic compounds, and inorganic compounds.

23. The method of claim 5, wherein the sample is a biological sample selected from amniotic fluid, aqueous humour, biopsy, blood, bone, breast milk, breath, cancerous sample, cartilage, cavity fluids, cerebrospinal fluid (CSF), cerumen (earwax), chime, chyle, connective tissue, cord blood, earwax, endolymph, epithelial tissue, exhaled breath condensates, exhaled condensate nasopharyngeal wash, feces, finger nail, fractionated blood, gastric acid, gastric fluid, gastric juice, glandular secretion, hair, interstitial fluids derived from tumorous tissue, lymph, lymphatic fluids, meconium, microbiota, mucus, muscle tissue, nasal drainage, nasal swab, nasopharyngeal wash, nervous tissue, ocular fluids, oil, pericardial fluid, perilymph, peritoneal fluid, phlegm, placental fluid, plasma, pleural fluid, pus, rheum, saliva, sebum, semen, serum, skin, spinal fluid, sputum, stool samples, sweat, synovial fluid, tears, throat swab, tissue, urine, vaginal fluid, vitreous humour, vomit, and whole blood.

24. The method of claim 5, wherein the spacers have a shape of pillars and a ratio of the width to the height of the pillar is equal or larger than one.

25. The method of claim 5, wherein the sample that is deposited on one or both of the plates has an unknown volume.

26. The method of claim 5, wherein the samples are for the detection, purification and quantification of chemical compounds or biomolecules that correlates with the stage of certain diseases.

27. The method of claim 5, wherein the samples are related to infectious and parasitic disease, injuries, cardiovascular disease, cancer, mental disorders, neuropsychiatric disorders, pulmonary diseases, renal diseases, and other and organic diseases.

28. The method of claim 5, wherein the samples are cells, tissues, bodily fluids, and stool.

29. The method of claim 5, wherein the sample is the sample in the fields of human, veterinary, agriculture, foods, environments, and drug testing.

30. The method of claim 1, wherein the initial sample comprises a material selected from the group consisting of: cells, tissues, stool, amniotic fluid, aqueous humour, vitreous humour, blood (e.g., whole blood, fractionated blood, plasma, serum, etc.), breast milk, cerebrospinal fluid (CSF), cerumen (earwax), chyle, chime, endolymph, perilymph, feces, gastric acid, gastric juice, lymph, mucus (including nasal drainage and phlegm), pericardial fluid, peritoneal fluid, pleural fluid, pus, rheum, saliva, sebum (skin oil), semen, sputum, sweat, synovial fluid, tears, vomit, urine, and exhaled condensate.

31. The method of claim 1, wherein the calibration marker and the analyte are independently selected from the group consisting of: proteins, peptides, DNAs, RNAs, nucleic acids, inorganic molecules and ions, organic small molecules, cells, tissues, viruses, nanoparticles with different shapes, and any combination thereof.

32. The method of claim 1, wherein the sample is whole blood, and wherein the whole blood is not diluted by a liquid.

33. The method of claim 1, wherein the calibration marker is selected from the group consisting of red blood cells, white blood cells, platelets, and any combination thereof.

34. A method for dilution calibration and blood sample analysis, comprising:
providing an initial blood sample containing a calibration marker and suspected of containing an analyte, wherein the calibration marker has an unknown concentration;
obtaining a first concentration of the calibration marker in the initial blood sample;
diluting the initial blood sample with an unknown volume of a diluent to form a diluted blood sample;
using an assay device to obtain a second concentration of the calibration marker and analyzing the analyte in the diluted blood sample; and
determining a dilution factor by comparing the first concentration and the second concentration, and calibrating the analysis of the analyte based on the dilution factor.

35. The method of claim 34, wherein the calibration marker is selected from the group consisting of: red blood cells, white blood cells, platelets, and any combination thereof.

36. The method of claim 34, wherein the calibration marker and the analyte are independently selected from the group consisting of: proteins, peptides, DNAs, RNAs, nucleic acids, inorganic molecules and ions, organic small molecules, cells, tissues, viruses, nanoparticles with different shapes, and any combination thereof.

37. The method of claim 34, wherein the sample is whole blood, and wherein the whole blood is not diluted by a liquid.

* * * * *